(12) United States Patent
Belinda et al.

(10) Patent No.: US 10,697,483 B2
(45) Date of Patent: Jun. 30, 2020

(54) TENSION BRACKET

(71) Applicant: OMG, Inc., Agawam, MA (US)

(72) Inventors: Richard L. Belinda, Westfield, MA (US); Mark A. Dicaire, Boylston, MA (US); Mark J. Guthrie, West Springfield, MA (US); Timothy F. Gillis, Florence, MA (US); R. Timothy Irwin, Lenox, MA (US)

(73) Assignee: OMG, Inc., Agawam, MA (US)

( * ) Notice: Subject to any disclaimer, the term of this patent is extended or adjusted under 35 U.S.C. 154(b) by 0 days.

(21) Appl. No.: 16/537,894

(22) Filed: Aug. 12, 2019

(65) Prior Publication Data

US 2019/0360513 A1 Nov. 28, 2019

Related U.S. Application Data

(62) Division of application No. 15/432,154, filed on Feb. 14, 2017, now Pat. No. 10,415,614.

(60) Provisional application No. 62/295,613, filed on Feb. 16, 2016, provisional application No. 62/347,286, filed on Jun. 8, 2016, provisional application No. 62/374,214, filed on Aug. 12, 2016.

(51) Int. Cl.
*F16M 13/00* (2006.01)
*F16B 5/02* (2006.01)
*F16B 15/00* (2006.01)

(52) U.S. Cl.
CPC ........ *F16B 5/02* (2013.01); *F16B 2015/0061* (2013.01); *F16B 2015/0076* (2013.01)

(58) Field of Classification Search
CPC .......... F16M 13/02; E04B 1/2403; E04B 1/40
USPC ............... 248/200, 62, 65, 49, 74.2, 74.1
See application file for complete search history.

(56) References Cited

U.S. PATENT DOCUMENTS

| | | | |
|---|---|---|---|
| 6,311,449 B1 | 11/2001 | Morse et al. | |
| 6,994,300 B2 * | 2/2006 | Labeirie | B64C 1/406 248/65 |
| 7,065,932 B2 | 6/2006 | Roesset et al. | |
| 7,356,973 B2 | 4/2008 | Roesset et al. | |
| 7,438,265 B2 | 10/2008 | Urzua | |
| 7,856,746 B1 | 12/2010 | Araujo | |
| 8,220,781 B2 | 7/2012 | Gray | |
| 8,555,580 B2 | 10/2013 | Vilasineekul | |
| 9,115,506 B2 | 8/2015 | Hill | |
| 2005/0189455 A1 | 9/2005 | Formon | |
| 2010/0012797 A1 | 1/2010 | Carter | |
| 2012/0097443 A1 | 4/2012 | Mazelle et al. | |

(Continued)

FOREIGN PATENT DOCUMENTS

GB 217038 6/1924

*Primary Examiner* — Steven M Marsh
(74) *Attorney, Agent, or Firm* — Alix, Yale & Ristas, LLP

(57) ABSTRACT

The tension bracket is configured to receive an elongated fastener to provide a connection under tension between a secondary structure and a principal support structure. The bracket has a mounting base with two substantially coplanar base sections having complementary opposed adjacent edges. The sections define a plurality of fastener openings and a profile opening. A guide member integrally extends from the sections and has parallel walls disposed above and extending perpendicular to the base sections. A pair of laterally spaced reinforcement ribs project perpendicularly from the base sections. In one embodiment, the tension bracket is formed from a single sheet of metal.

20 Claims, 25 Drawing Sheets

(56) References Cited

U.S. PATENT DOCUMENTS

2012/0145838 A1\* 6/2012 Chiu .................. H02G 3/32
  248/74.2
2012/0315081 A1  12/2012 Bouldin et al.
2014/0131528 A1\* 5/2014 Blakeley ............. H02G 3/32
  248/74.2

\* cited by examiner

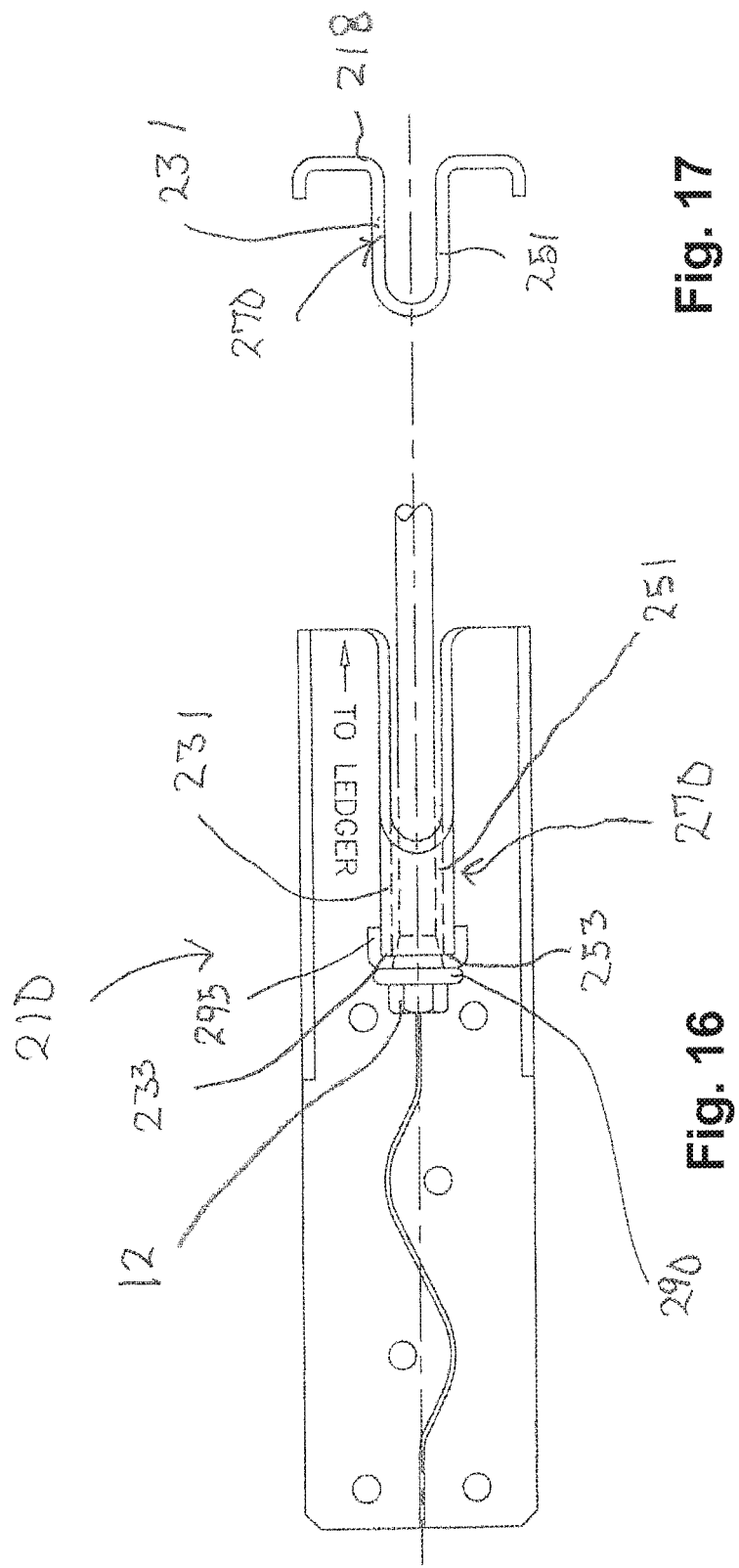

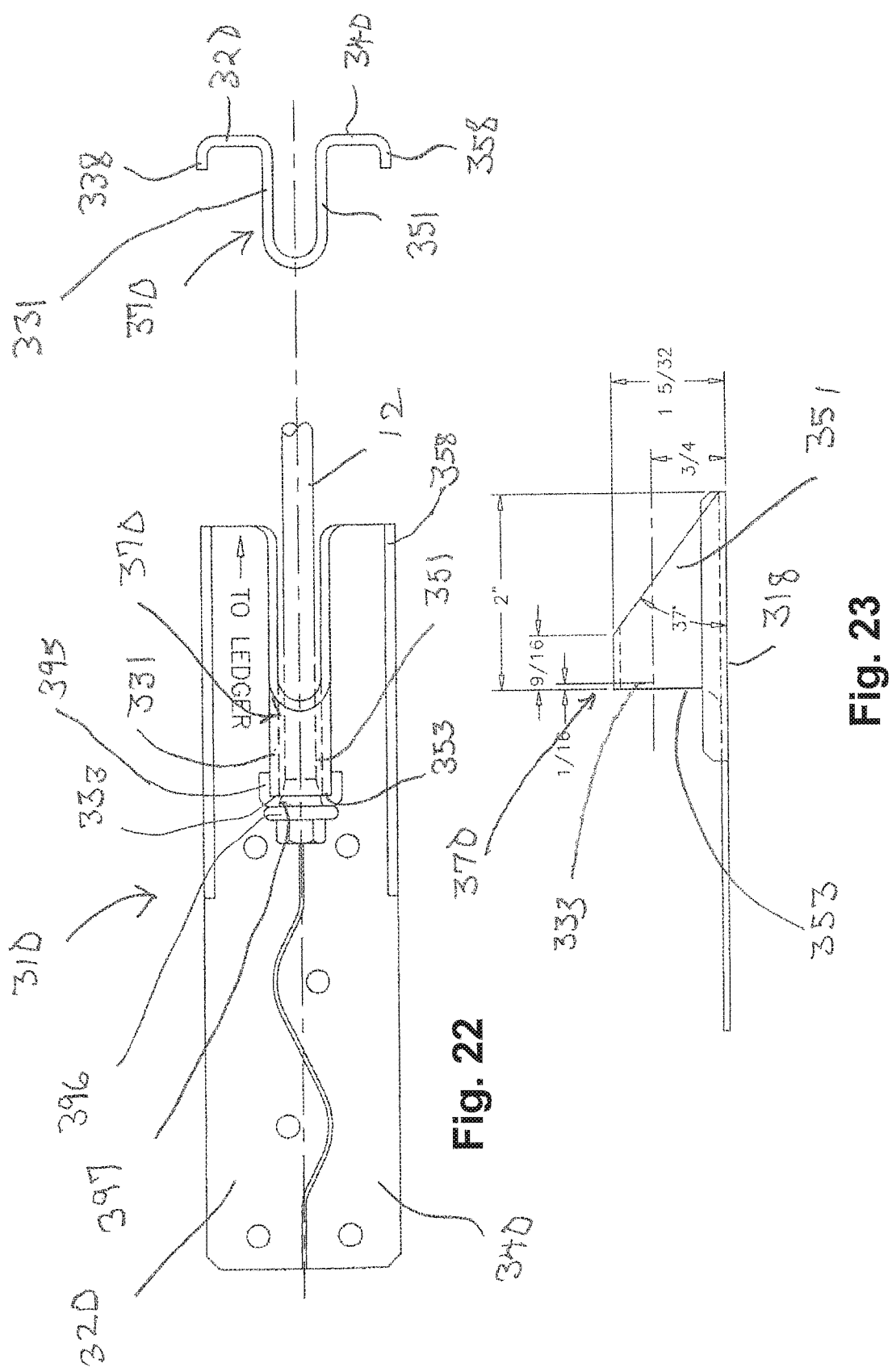

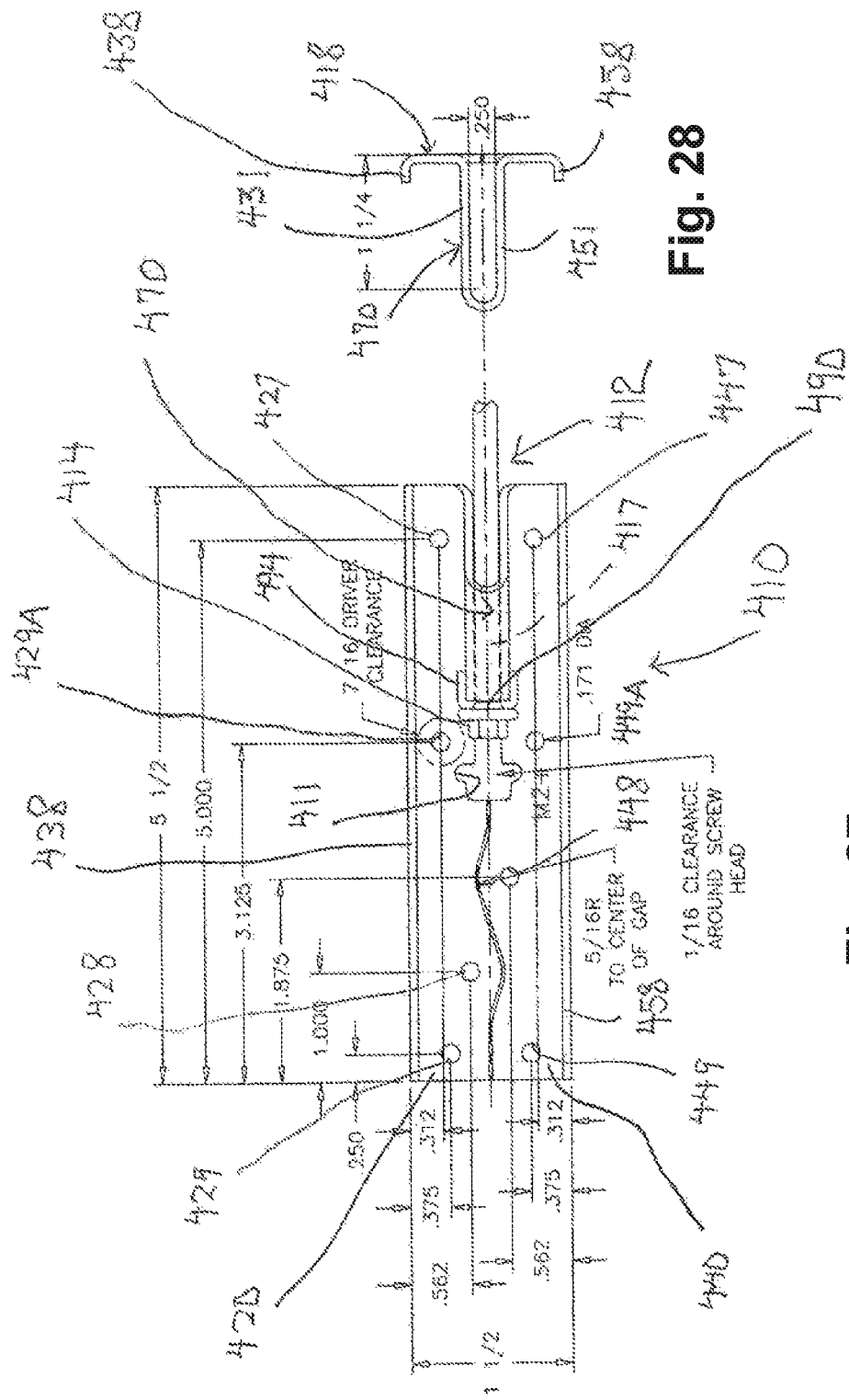

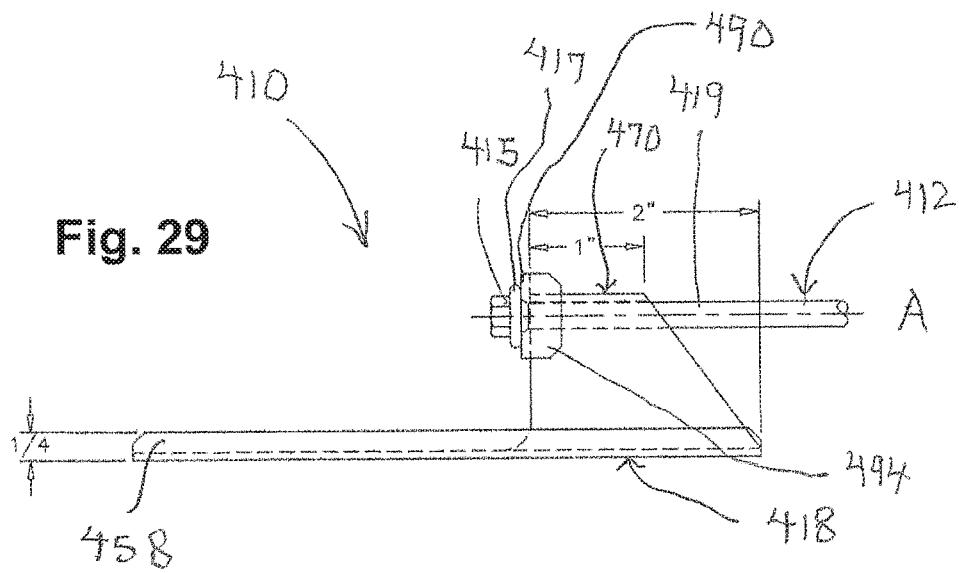
Fig. 29
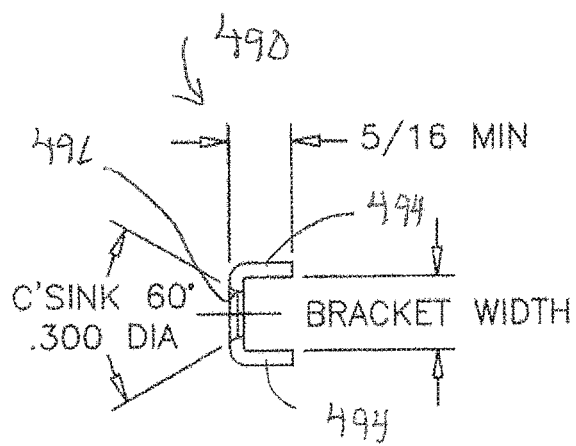
Fig. 30
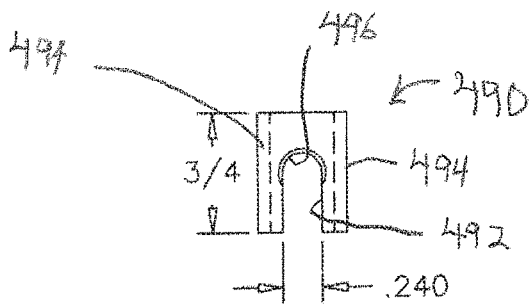
Fig. 31
Fig. 32

TENSION BRACKET

CROSS-REFERENCE TO RELATED APPLICATIONS

This application is a divisional of U.S. patent application Ser. No. 15/432,154, filed on Feb. 14, 2017, which application claims the priority of U.S. Provisional Application No. 62/295,613, filed on Feb. 16, 2016, U.S. Provisional Application No. 62/347,286, filed on Jun. 8, 2016, and U.S. Provisional Application No. 62/374,214, filed on Aug. 12, 2016, the disclosures of which applications are incorporated by reference in their entirety.

BACKGROUND

This disclosure relates generally to hardware and methods employed for tying or connecting a secondary assembly to a main structure such as, for example, through a sill, a top plate or a stud structure. More particularly, this disclosure relates to brackets which are mounted to deck joists or elongated wood components and receive elongated fasteners that thread into wood components of the principal structure.

In bracket assemblies to which the present disclosure relates, a metal bracket is fastened to a joist or other elongated wood structure. Many of the brackets are L-shaped and include an opening through a leg of the bracket that receives a fastener. The fastener is threadably anchored to tie the deck to the principal structure. Various bracket configurations have been advanced. With mixed success, the conventional brackets attempt to address the constraints of providing a rigid bracket structure which may be mounted via fasteners to a joist or similar wood member to provide a high integrity bonding, and a bracket structure which accepts and engages a heavy duty fastener and provides a fastener head/bracket interface of high structural integrity when the fastener is driven into the anchoring structure.

The present disclosure is directed to a bracket which is especially adapted for easy installation to efficiently transfer a load under tension to a shear load on fasteners anchoring the bracket to a fixed structure.

SUMMARY

In a preferred embodiment, a bracket has a mounting base and a guide member. The mounting base comprises two adjacent base sections having adjacent complementary edges. Each base section defines a top surface and a bottom surface and extends from a rear edge to a front edge. One or more fastener openings extend from the top surface to the bottom surface of each respective base section. The guide member extends above the top surfaces of the base sections and has a rear edge and an opposite front edge. The adjacent complimentary edges of the base sections combine to define a fastener profile opening extending from a proximal end intermediate the front edges and rear edges of the base member to a distal portion extending from the proximal end through the front edges of the base members.

In another embodiment, a bracket comprises a sheet and a guide. The sheet has adjacent complimentary edges extending from a rear end to a front end, which thereby forms two opposing lateral sections extending from the forward end to the rear end. Each of the adjacent complimentary edges has a profile section aligned with one another to combine to accommodate a portion of an elongate fastener. The guide defines a longitudinal axis spaced from the surfaces and laterally aligned with the adjacent complimentary edges.

Another embodiment of the bracket has a sheet with medial edges disposed in an adjacent relationship and form sections having coplanar surfaces extending from a forward end to a rear end. The bracket also includes a guide with generally parallel wall portions that define a guide slot. The wall portions extend integrally from the sections. One or more openings are defined in each of said coplanar surfaces. Each of the adjacent medial edges of the sheet includes a profile section with each profile section in lateral alignment with the other profile section. The profile sections extend through the forward end of the respective coplanar surface.

BRIEF DESCRIPTION OF THE DRAWINGS

FIG. 16 is a top plan diagrammatic view, portions in phantom, of a third embodiment of a bracket together with a fastener assembly partly broken away;

FIG. 17 is an end view of the bracket of FIG. 16;

FIG. 22 is a top plan view, portions in phantom, portions broken away and portions schematically illustrated, of a fourth embodiment of a bracket together with a fastener assembly;

FIG. 23 is a side elevational view, portions in phantom and portions in diagram form, of the bracket of FIG. 22;

FIG. 27 is a diagrammatic top plan view, portions in phantom, of a fifth embodiment of a bracket together with a fastener assembly partially broken away;

FIG. 28 is a diagrammatic end view of the bracket of FIG. 27;

FIG. 29 is a diagrammatic side view, portions in phantom, of the bracket and fastener of FIG. 27;

FIG. 30 is a diagrammatic top plan view, portions in phantom, of the retainer washer employed with the bracket/fastener assembly of FIG. 27;

FIG. 31 is a diagrammatic left end view, portions in phantom, of the retainer washer employed with the bracket/fastener assembly of FIG. 27;

FIG. 32 is a side view, portions in phantom, of the retainer washer employed with the bracket/fastener assembly of FIG. 27;

DETAILED DESCRIPTION

With reference to the drawings wherein like numerals represent like parts throughout the several figures, a bracket in accordance with the present disclosure is generally designated by the numeral 10. The bracket 10 has particular application in relation to tie-in assemblies which connect under tension a secondary structure, such as a deck, to a wood component of the principal structure. The bracket 10, as well as all the other disclosed brackets hereafter, functions to transfer a load under tension from, for example, a ledger board, to a shear load on the fasteners which anchor the bracket to a joist. The brackets can also be employed to connect a deck post or a floor-to-floor connection and numerous other applications.

Figure 5:
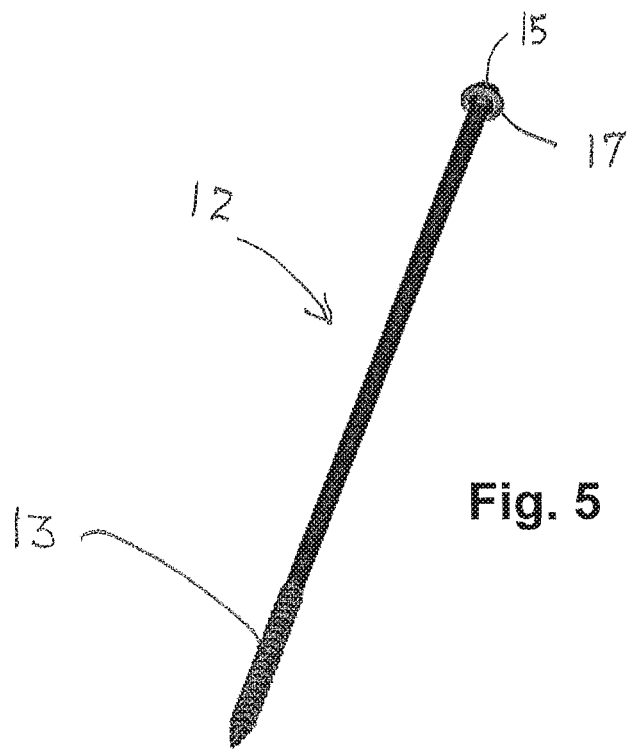
FIG. 5 is a perspective view of an elongated fastener which is employed with the bracket of FIG. 1.
Figure 6:
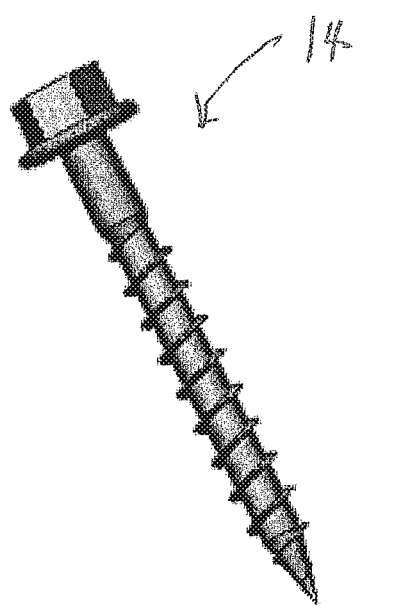
FIG. 6 is an enlarged perspective view of a representative fastener which is employed together with multiple identical fasteners for fastening the bracket of FIG. 1 to a joist or wood member.

The bracket 10 receives an elongated heavy duty fastener 12, such as depicted in FIG. 5, which implements the high tension connection. The bracket is fastened to a structure, such as a deck joist, by a multiplicity of threaded fasteners 14, such as one of which is illustrated in FIG. 6. Multiple brackets/fasteners installations are typically required to effectively connect the secondary structure to the principal structure and satisfy applicable building codes. For purposes of illustration of a preferred installation, the tension brackets are primarily described in the context of connecting a deck to a principal structure.

Figure 9:
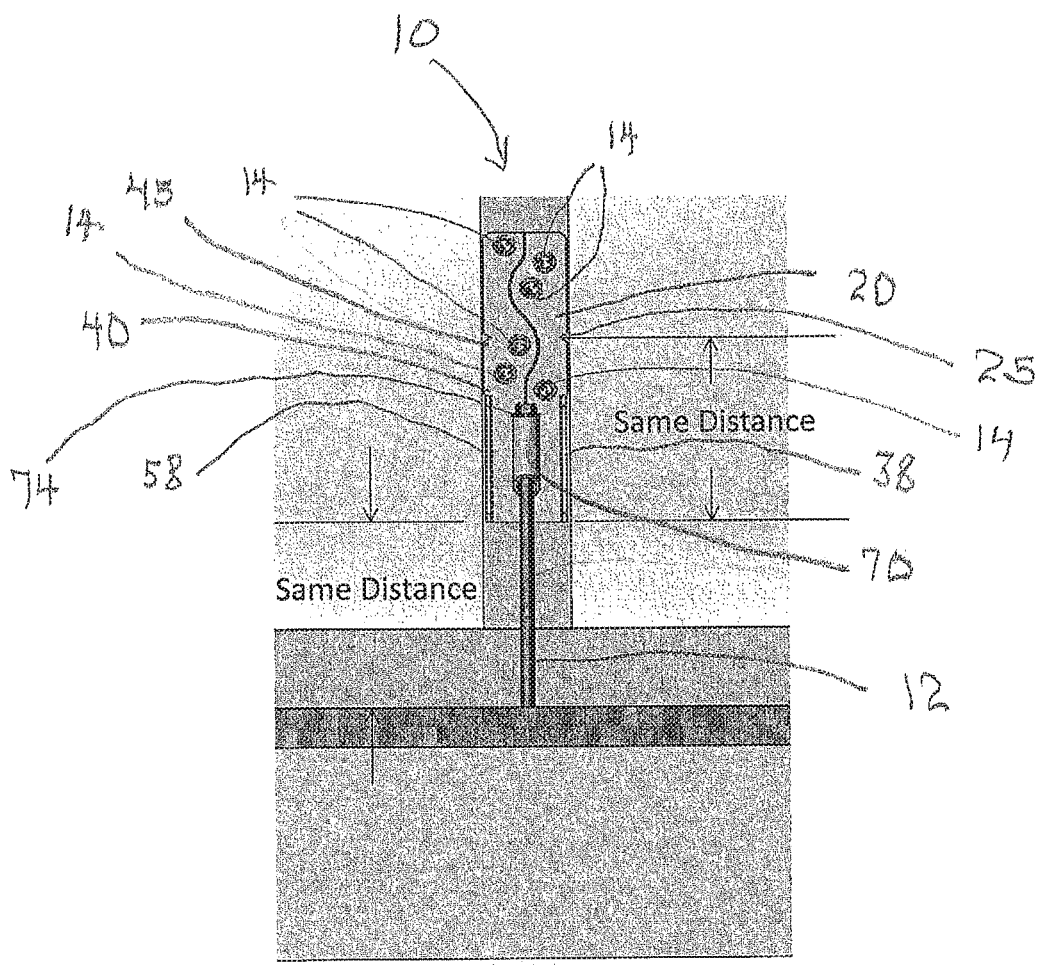
FIG. 9 is a bottom diagrammatic view of the installation of FIG. 8.

The bracket 10 is a rugged heavy duty component made of steel, and preferably stainless steel, from a single unitary piece of material which is cut, formed and bent to provide the final rigid configuration. The bracket 10 is especially configured to provide a high degree of fastening integrity to the joist, to provide a very high degree of fastener/bracket interface integrity to enhance the anchoring of the fastener 12 under tension to the principal support structure, and to accommodate and maintain a substantial tension force without compromising the bracket structure. The bracket 10 is dimensioned so that it can be mounted to the bottom edge of a deck joist, as illustrated in FIG. 9. Dimensions for one embodiment of bracket 10 are indicated in inches in FIGS. 2-4. The bracket 10 is also suitable for various other mounting locations and scenarios, as further described below.

The bracket 10 has a base 18 comprising a pair of coplanar base sections 20 and 40 which longitudinally extend from a front 22, 42 to a rear 24, and medially engage along serpentine edges 26, 46 which are complementary to each other. Each section 20, 40 has a forward central vertical support wall 30, 50 which integrally extends from the base and forms a rigid support pedestal 60 for an integral guide cylinder 70. The guide cylinder 70 has a central longitudinal axis 75 which is parallel to the base. The inner diameter of the guide cylinder 70 is slightly larger than the maximum diameter of the threads 13 of fastener 12. The guide cylinder 70 properly locates the entry point for the fastener 12 and guides the fastener 12 at the proper orientation while it is being driven.

The forward edge portions 32, 52, 72 of the support walls 30, 50 and the cylinder 70 are preferably tapered at a 45° angle. The rear edge portions 34, 54, 74 of the walls and the cylinder are substantially vertical except for a chamfer 36, 56 at the lower portion of the support walls. The chamfers potentially accommodate an engaged board or wood component. In one embodiment, the inside diameter of the guide cylinder 70 is approximately 0.320 inches and the central axis 75 is spaced 0.750 inches from the bottom surface of the base 18. The walls 30, 50 of the pedestal extend approximately 0.466 inches from the top surface of the base. The guide assembly comprising the guide cylinder 70 and the upright walls 30, 50 longitudinally extends rearwardly approximately 2 inches from the front of the bracket (see FIG. 4).

Figure 1:
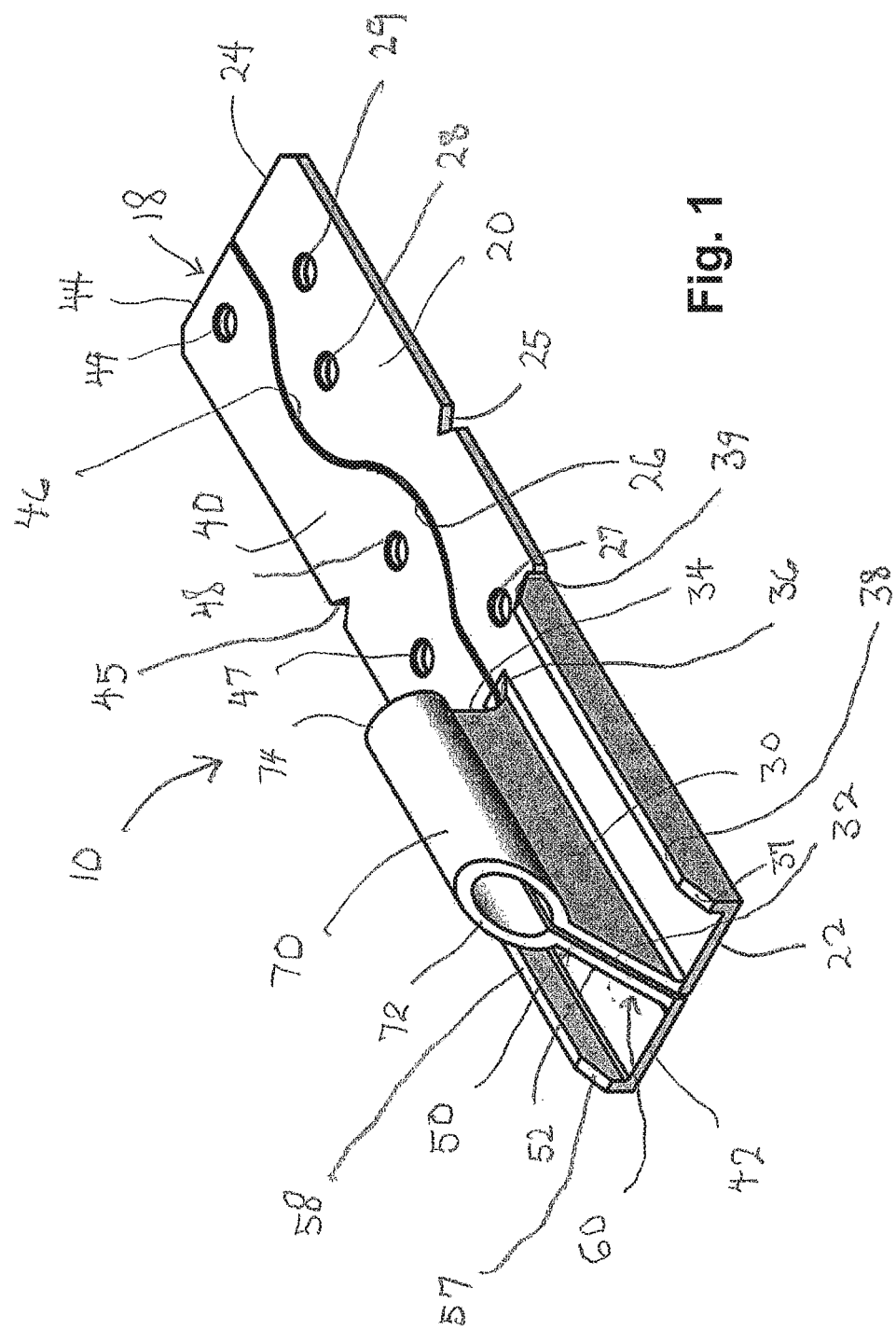
FIG. 1 is a perspective view of a bracket in accordance with the present disclosure.
Figure 2:
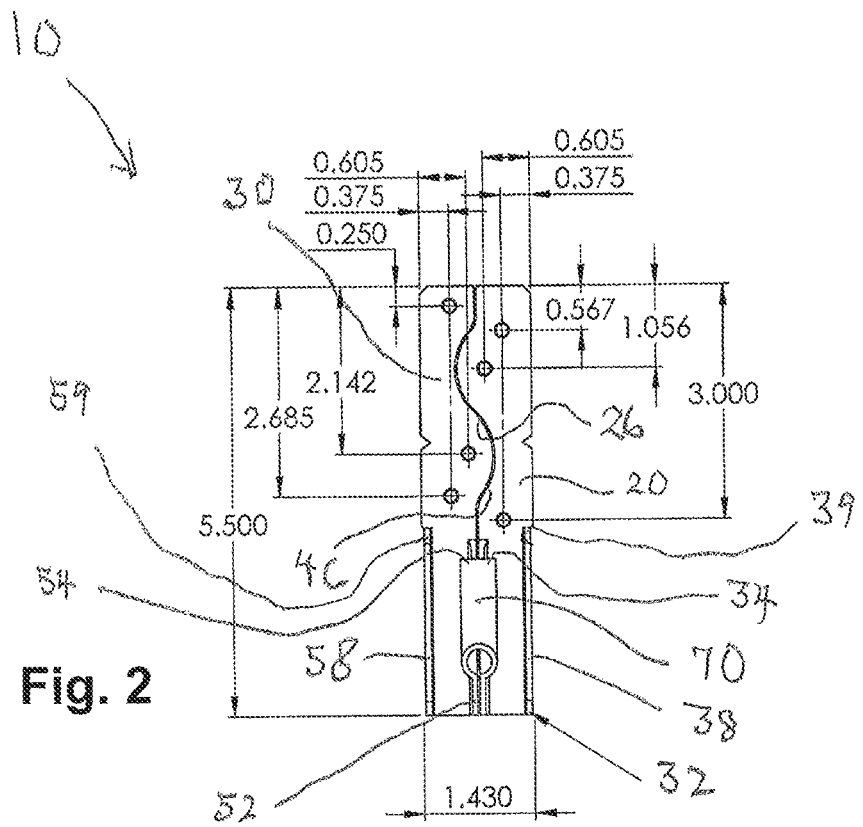
FIG. 2 is a top plan diagrammatic view of the bracket of FIG. 1.
Figure 3:
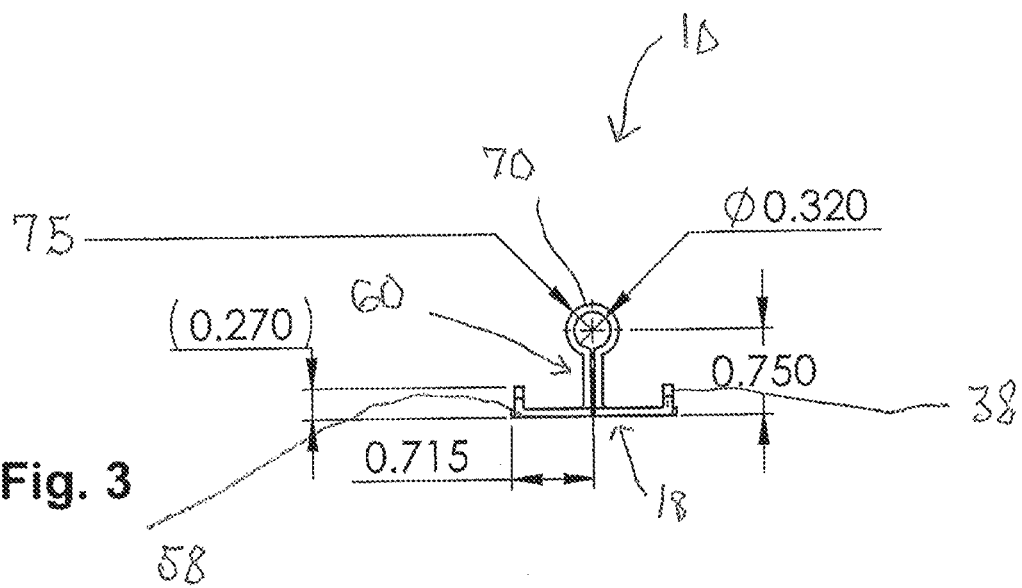
FIG. 3 is an end diagrammatic view of the bracket of FIG. 1.
Figure 4:
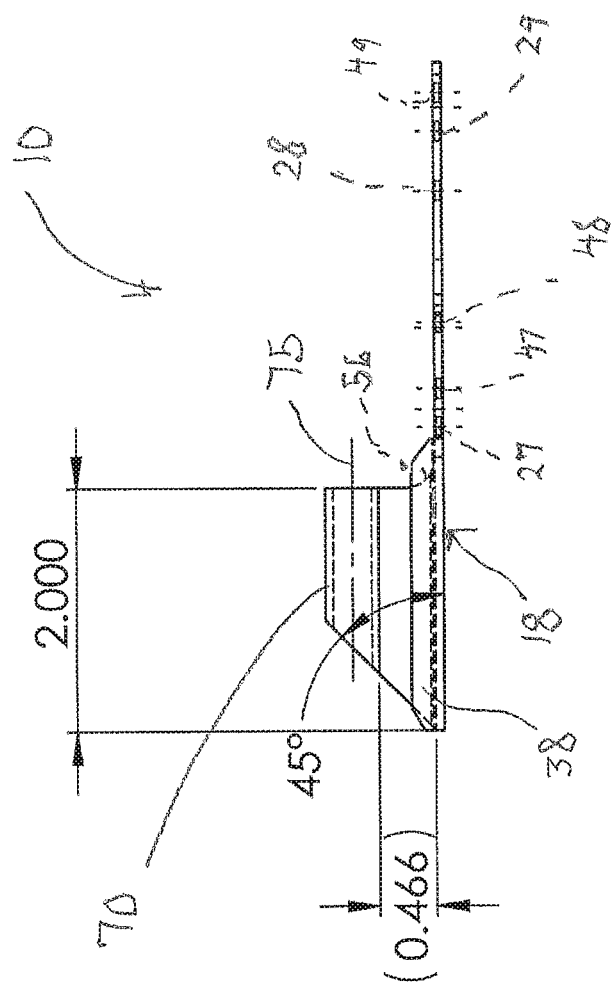
FIG. 4 is a side diagrammatic view, partly in phantom, of the bracket of FIG. 1.

Each of the sections 20, 40 includes openings 27, 28, 29 and 47, 48, 49 which generally do not longitudinally or transversely align, as particularly illustrated in FIGS. 1, 2 and 4. The openings have a slight chamfer and are dimensioned to accept a fastener 14, such as illustrated in FIG. 6. Six openings are illustrated in the drawings, although additional openings may be provided. The purpose of the non-aligned positioning of the openings, as well as the serpentine engagement of the edges 26, 46, is to provide a bracket engagement which does not easily strip away from the wood surface to which the bracket is mounted due to the tension force provided by the bracket installation. The openings locate the fastener 14 so they will engage the longitudinal grain of the wood in non-aligned and essentially random positions which mitigate against splitting and effectively distribute the tension forces upon installation.

Transversely spaced upright reinforcement ribs 38 and 58 extend longitudinally from the front of the bracket rearwardly to an intermediate position to provide a reinforcement structure to prevent buckling of the bracket under an intense tension force when it is fully installed. The ribs preferably have chamfers 37, 39 and 57, 59. V-shaped notches 25 and 55 are disposed at a location 3.5 inches from the rear of the bracket to provide a measurement indicator for optimal placement of the bracket, as best illustrated in FIG. 9.

One preferred fastener 12 for the bracket is a LogHog® fastener or a ThruLok® 9 inch fastener with 3 inch threads 13 manufactured and marketed by OMG, Inc., of Agawam, Mass. The ThruLok® fastener also has a half-point and a hex head 15 with an integral retaining washer forming an integral flange 17.

The preferred fastener 14 for mounting the bracket 10 to the joist is a 1½ inch long fastener with a ¼ inch hex drive with an integral flange and a #8 or #10 diameter with 9 threads per inch and a 1.250 thread length and a gimlet point as illustrated in FIG. 6. Multiple fasteners 14 are required. Naturally, fasteners with other configurations may be employed.

Figure 7:
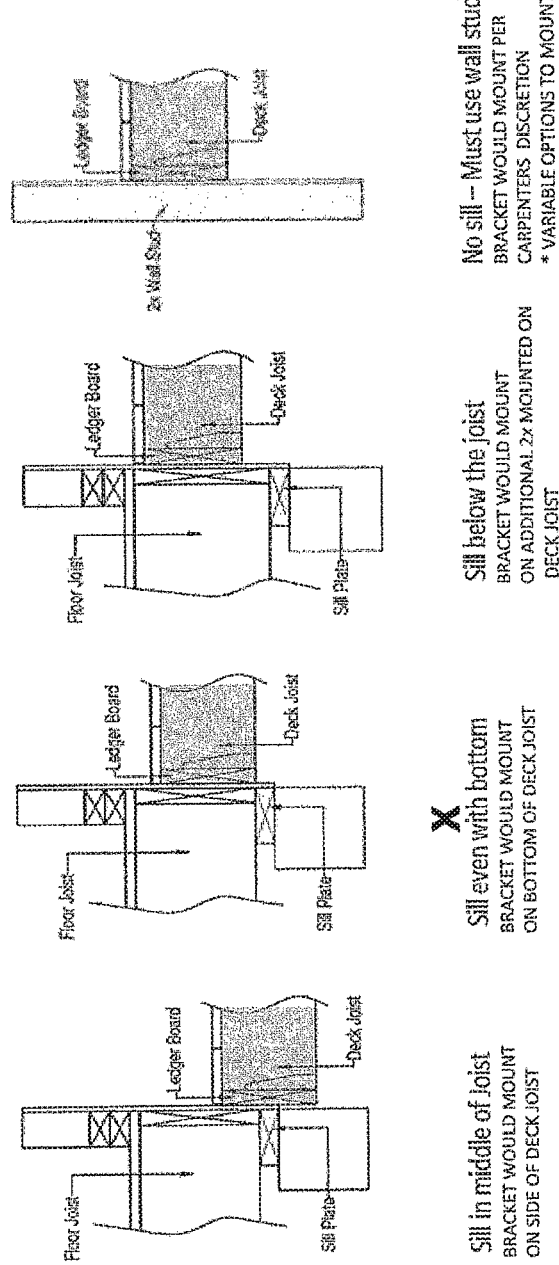
FIGS. 7A-7D are annotated schematic illustrations of possible sill-to-ledger/joist alignment scenarios for which the bracket of FIG. 1 is adapted for installation.

Four typical sill-to-ledger/joist alignment scenarios are illustrated in FIGS. 7A-7D. The bracket 10, together with the fasteners 12 and 14, are adapted to provide an easily installed connection between the deck joist and the main structure for each of the scenarios. FIG. 7A illustrates a construction wherein the sill is in the middle of the joist; FIG. 7B illustrates a construction wherein the sill is even with the bottom edge of the deck joist; FIG. 7C illustrates a construction wherein the sill is below the bottom edge of the deck joist; and FIG. 7D illustrates a construction wherein there is no sill plate and a connection must be accomplished with the wall stud.

Figure 8:
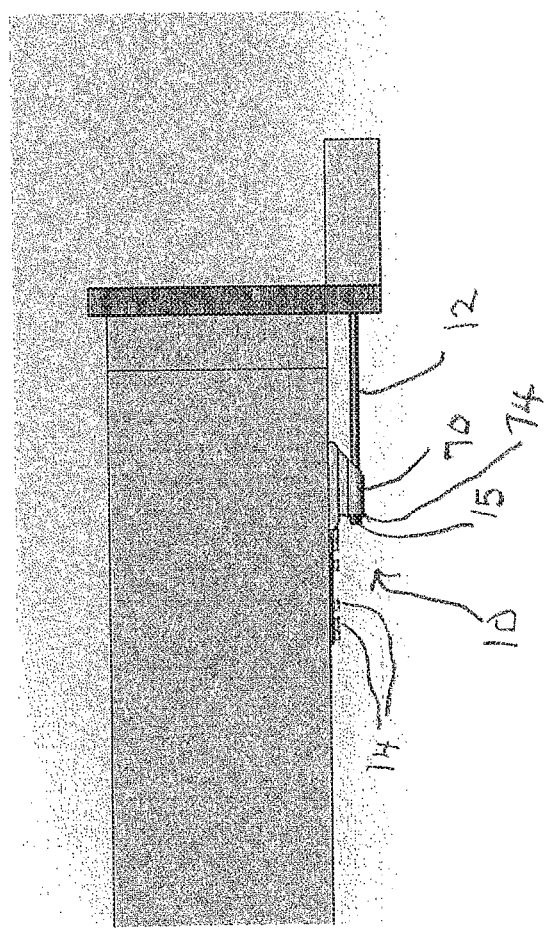
FIG. 8 is a side view of an installation of the bracket of FIG. 1 for the scenario of FIG. 7B.

FIGS. 8 and 9 illustrate a bracket installation for the construction configuration of FIG. 7B. The bracket 10 is aligned and mounted to the bottom edge of the deck joist by the fasteners 14. Fastener 12 is driven into the sill plate until the head flange 17 engages against the rear edge 74 of the guide cylinder 70. As best illustrated in FIG. 9, the notches 25, 45 provide a convenient indication for proper placement of the bracket on the joist. For some construction configurations, such as illustrated in FIGS. 7A and 7D, the bracket is mounted to the side of the deck joist and driven into either the sill plate (if there is any) or a wall stud. It will be appreciated that the bracket installations are preferably completed for each of the deck joists.

The bracket is initially properly positioned and fasteners 14 are driven through the openings 27, 28, 29 and 47, 48, 49 to secure the bracket to the joist. The elongated fastener 12 is then inserted into the guide cylinder 70 and driven into the principal support structure until the head (or flange 17 of the head or a washer) engages against the end 74 of the guide cylinder 70. It should be appreciated for a given project numerous bracket assemblies as described are installed to provide the proper connecting integrity for the deck/principal structure interface.

Figure 10:
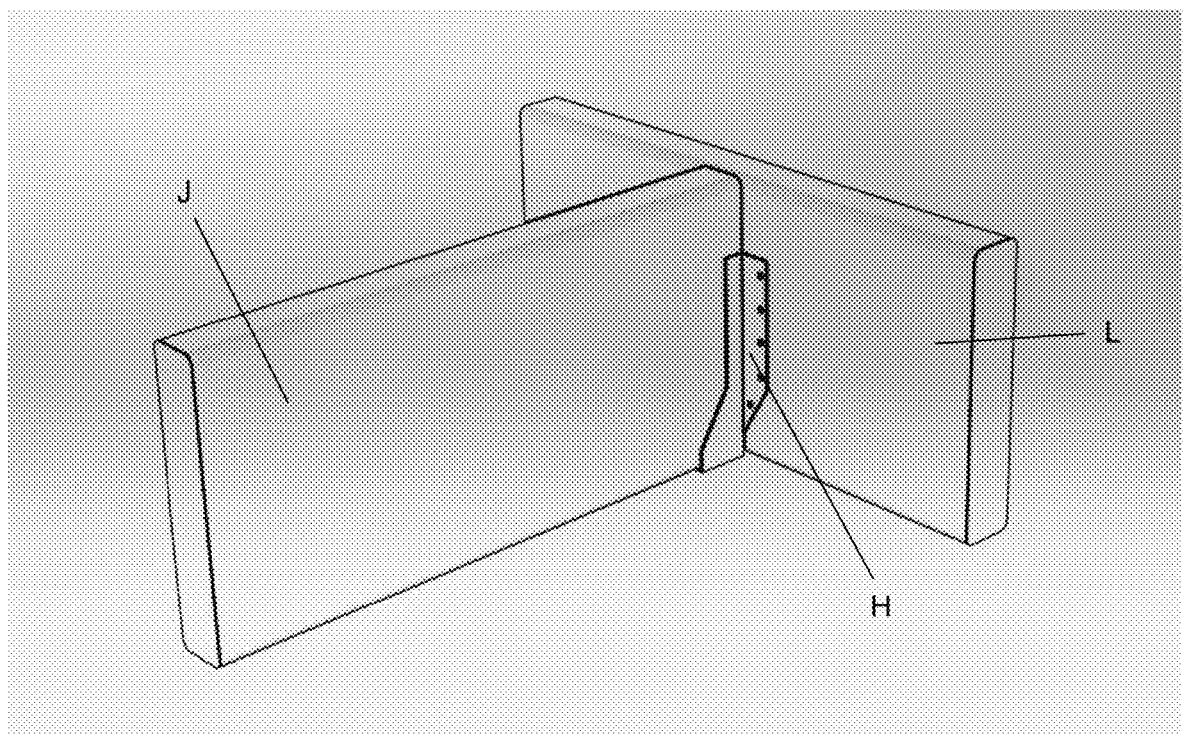
FIG. 10 is a perspective view illustrating a joist joined to a ledger board by a joist hanger.
Figure 11:
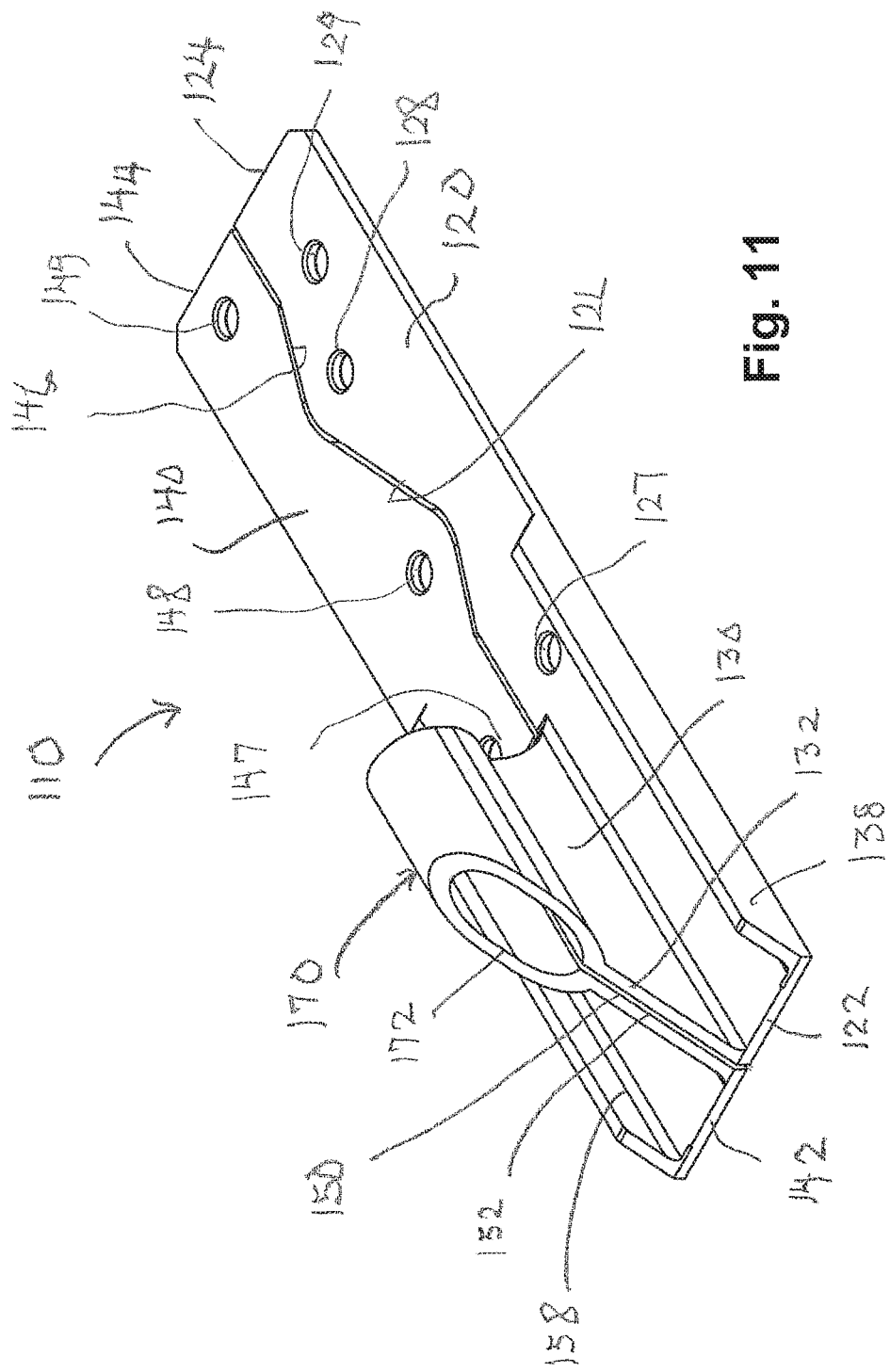
FIG. 11 is a perspective view of a second embodiment of a bracket.
Figure 12:
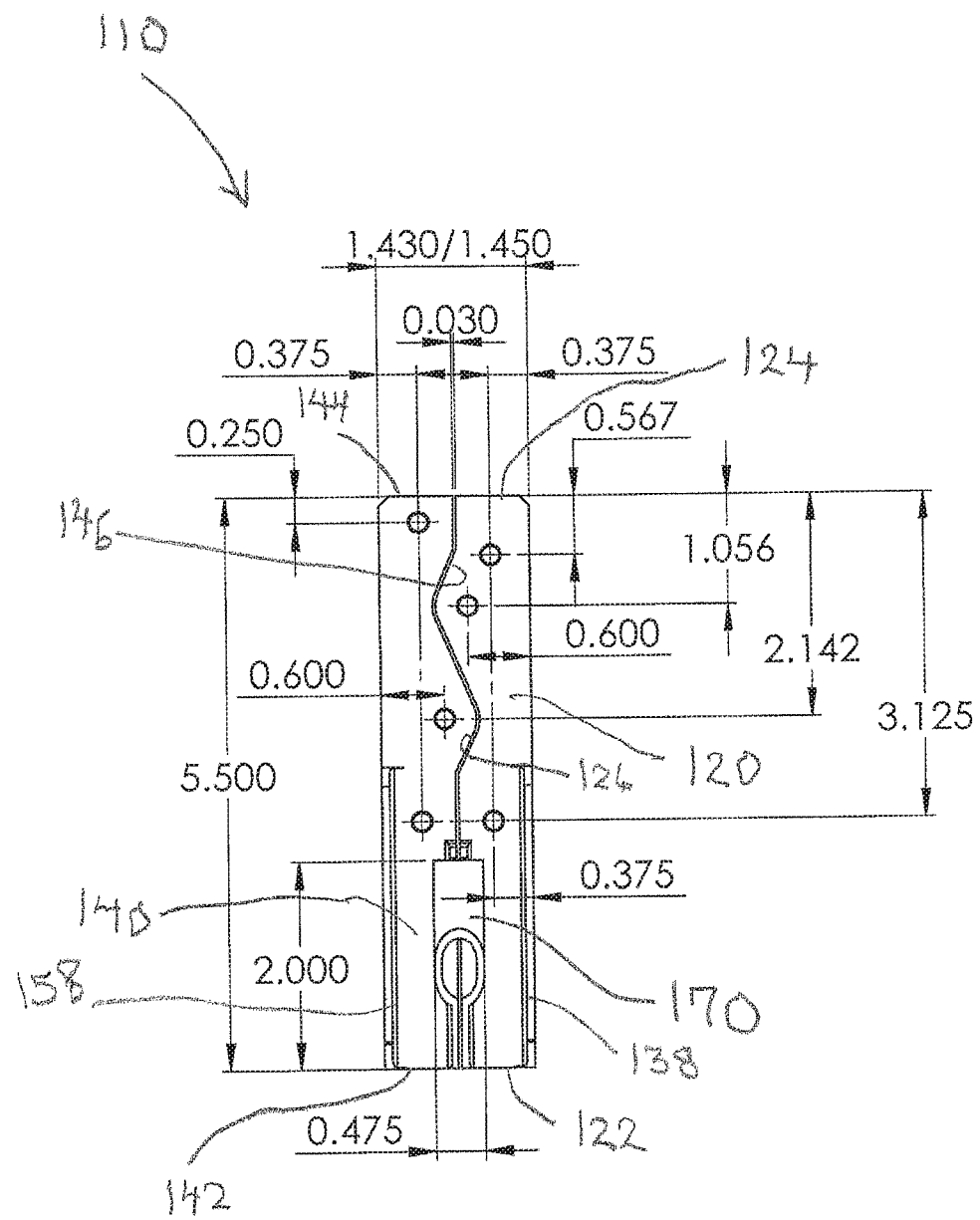
FIG. 12 is a top plan diagrammatic view of the bracket of FIG. 11.

With reference to FIG. 10, a deck joist J may be joined to a ledger board L by a joist hanger H which is fastened in the corner at the intersection. For such an application, it is possible that the joist hanger H will present a slight clearance problem for a deck tension bracket in that the central axis of the guide cylinder 70, such as would be employed in bracket 10, is not sufficiently spaced so as to provide sufficient clearance for entry of the fastener.

FIGS. 11-15 illustrate a bracket 110 which accommodates a space constraint wherein the guide cylinder 70 for bracket 10 would not provide sufficient clearance such as, for example, a tie-in for the deck joist J/ledger board L/joist hanger H structure of FIG. 10. The corresponding structures of bracket 110 in FIGS. 11-15 are designated with the same numerals as the structures for bracket 10 preceded by the numeral 1. All dimensions are in inches.

A key focus for bracket 110 is the integral fastener guide 170 which is now not cylindrical in shape, but has more of an oblong, oval-type shape elongated from the bottom to the top. The integral guide 170 in transverse dimension is slightly larger than the maximum diameter of the threads 13 of fastener 12 and in vertical dimension is significantly larger than the maximum diameter of the threads 13. The central longitudinal axis 175 is parallel to the base sections 120 and 140 which longitudinally extend from a front 122, 142 to a rear 124 and 144 and again immediately engage along serpentine edges 126, 146 which are complementary to each other.

Figure 13:
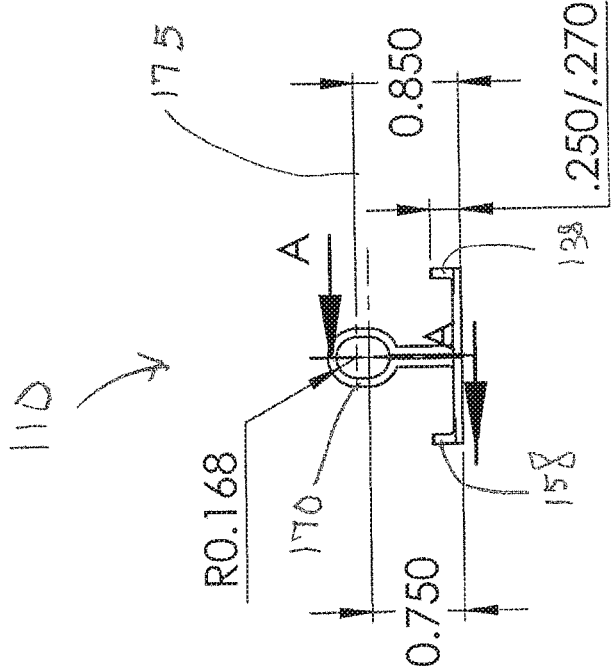
FIG. 13 is an end diagrammatic view of the bracket of FIG. 11.
Figure 15:
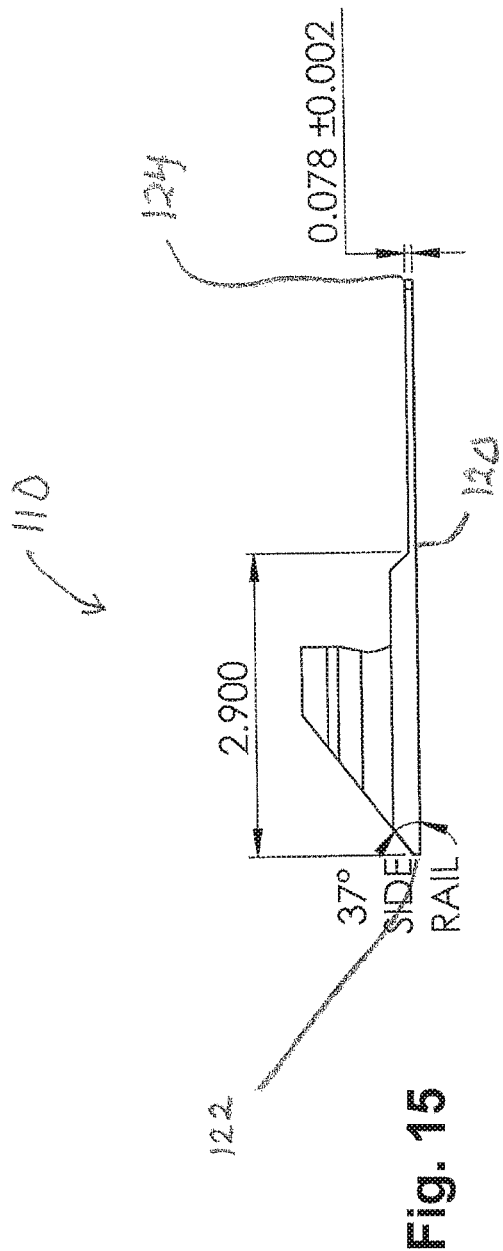
FIG. 15 is a side diagrammatic view of the bracket of FIG. 11.
Figure 14:
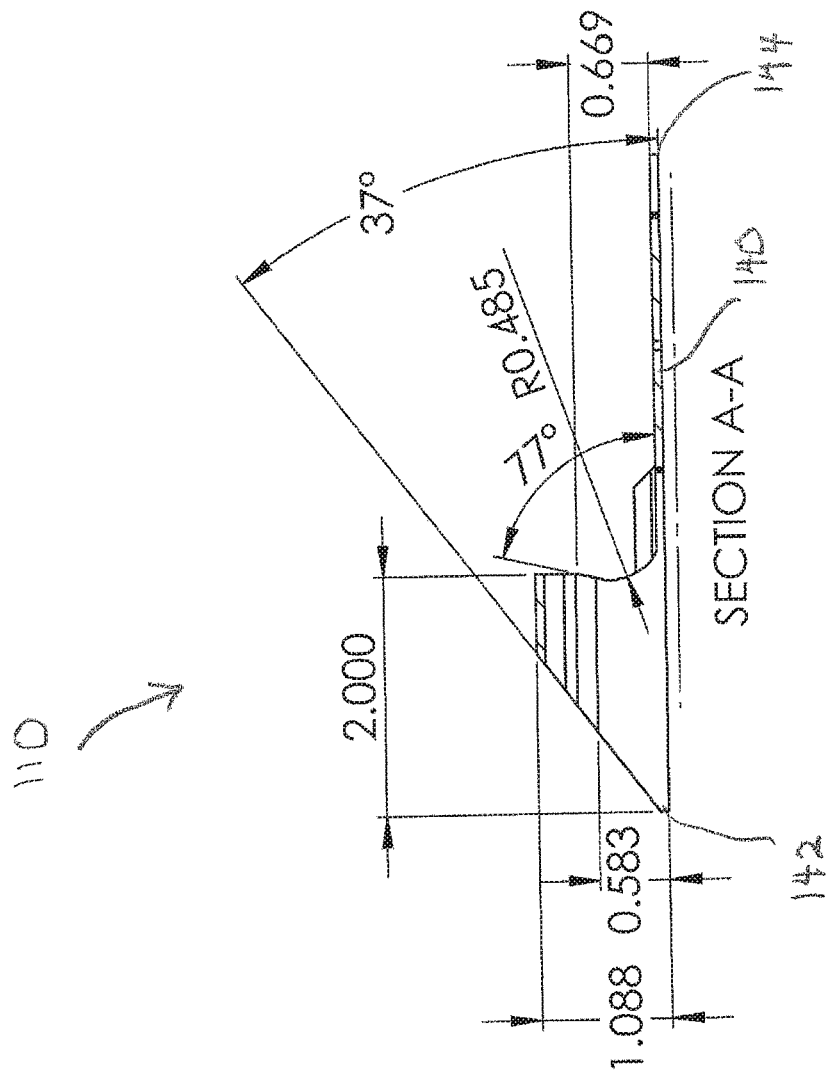
FIG. 14 is a sectional diagrammatic view, taken along the lines A-A, of FIG. 13.

In this embodiment, the forward edge portions 132, 152 and 172 of the corresponding support walls 130, 150 and the fastener guide 170 are preferably tapered at a 37° angle, such as illustrated in FIG. 15. A central axis 175 of the guide 170 is preferably spaced 0.850 inches from the bottom surface of the base (FIG. 13). The geometry of the guide 170 allows for the fastener to be adjusted along a range of heights above the bottom of the base 120, 140 so that the fastener entry point into the ledger board such as, for example, with the construction of FIG. 10 will allow the fastener to be generally parallel to the base and to clear the outer edges of the joist hanger H.

The bracket 110 has openings 127, 128, 129, 147, 148, 149 with a slight chamfer which are dimensioned to accept a fastener 14. The bracket also includes transversely spaced upright reinforcement ribs 138 and 158 to provide a reinforcement structure to prevent buckling of the bracket 110 under intense tension when it is fully installed. The ribs 138, 158 may also be chamfered.

FIGS. 16-21 illustrate a bracket 210 which accommodates a headroom constraint wherein the guide cylinder 70 of bracket 10 would not provide sufficient clearance. It will be appreciated that corresponding structures of bracket 210 are designated with the same numerals as bracket 10 preceded by the numeral 2 in FIGS. 16-21. The dimensions are in inches. Rather than a guide cylinder 70, a guide slot 270 which has generally parallel guide walls 231 and 251 is provided. The guide slot 270 may extend a greater distance from the base 218 than guide cylinder 70. The distance between the guide walls 231 and 251 is slightly larger than the maximum diameter of the threads 13 of the fastener 12. The guide slot allows for the fastener to more easily locate a proper entry point for the fastener and may provide for a slightly non-parallel or offset acute angle orientation of the fastener relative to the base 218.

Figure 18:
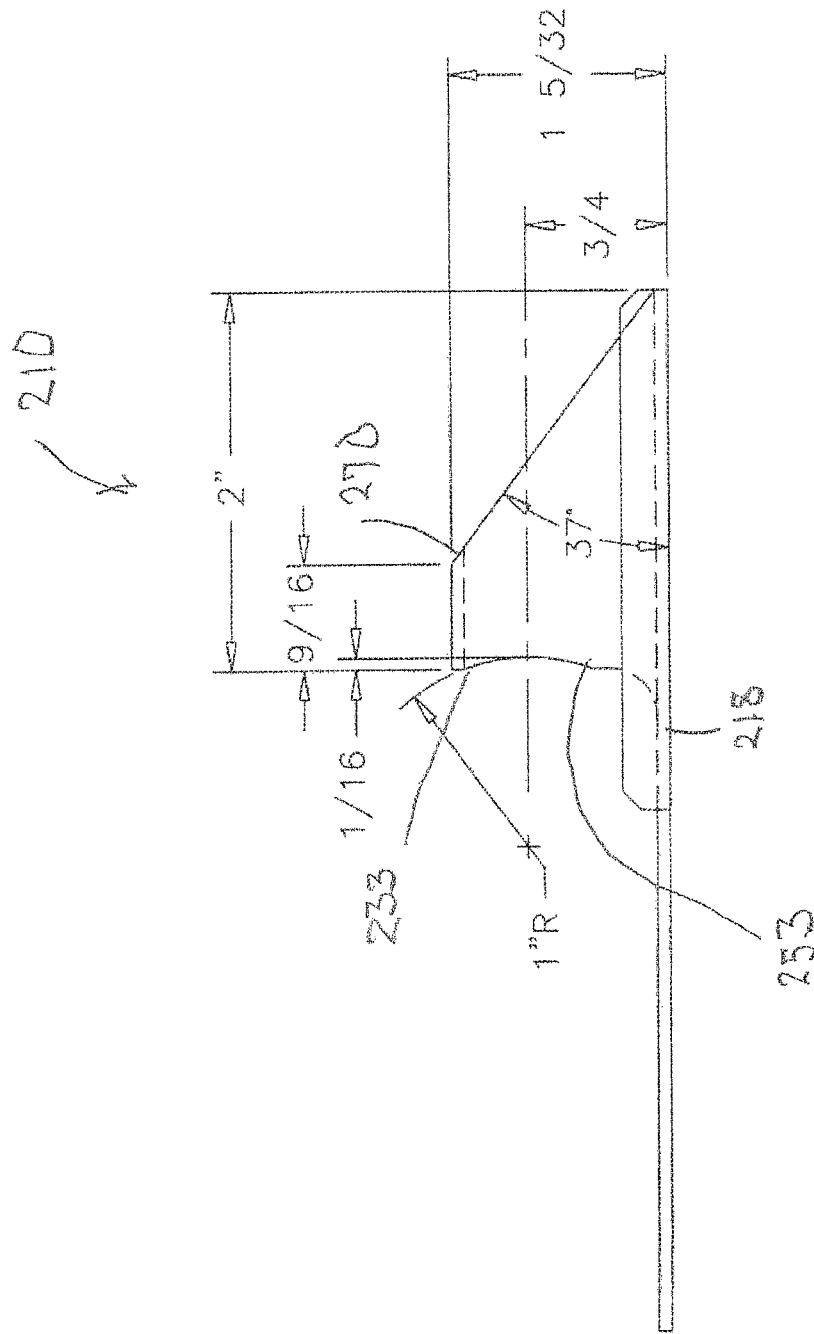
FIG. 18 is a side diagrammatic view, portions in phantom, of the bracket of FIG. 16.
Figure 19:
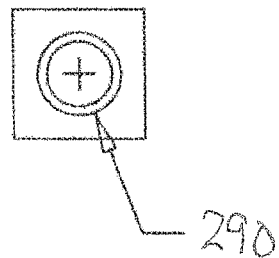
FIG. 19 is an enlarged left side view of a retainer washer employed with the bracket of FIG. 16.
Figure 20:
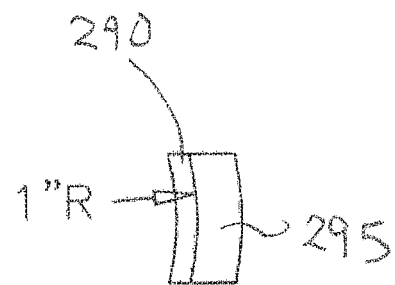
FIG. 20 is an enlarged side view of the retainer washer employed with the bracket of FIG. 16.
Figure 21:
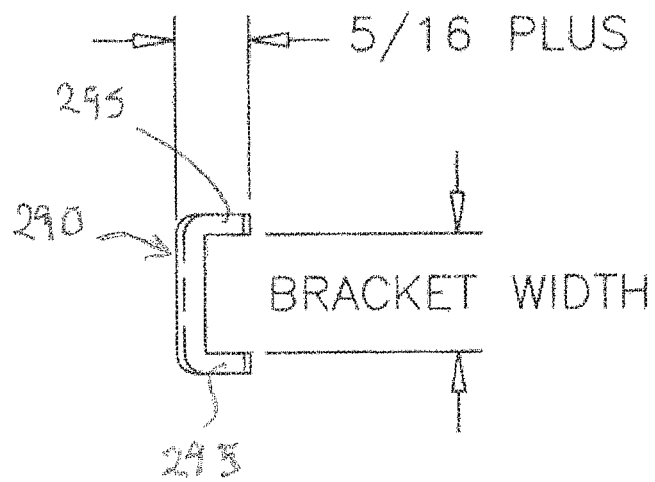
FIG. 21 is an enlarged diagrammatic top view, partly in phantom, of the retainer washer employed with the bracket of FIG. 16.
Figure 24:
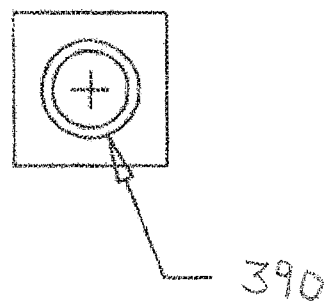
FIG. 24 is an enlarged left side view of a retainer washer employed with the bracket of FIG. 22.

As best illustrated in FIG. 18, the rear edge 233 and 253 of the guide walls 231 and 251 may have a slight concavity, for example, one inch radius as illustrated in the drawings. This allows for the fastener to be slightly angled and not parallel with the base so that the fastener can clear the joist hanger H, for example. A retainer washer 290 with a concavity which matches the concavity of the rear edge 233, 253 of the wall may be provided, such as illustrated in FIGS. 19 and 20. The retainer washer has a generally U-shape with locking tabs 295 and is mounted to the rear edges so as to engage the walls 231 and 251 and prevent them from transversely separating.

Figure 25:
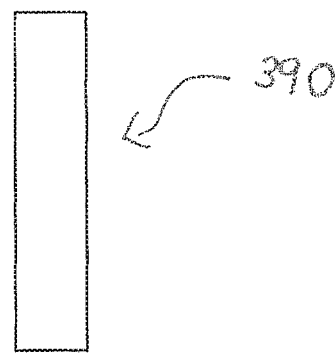
FIG. 25 is an enlarged side view of the retainer washer of FIG. 24.
Figure 26:
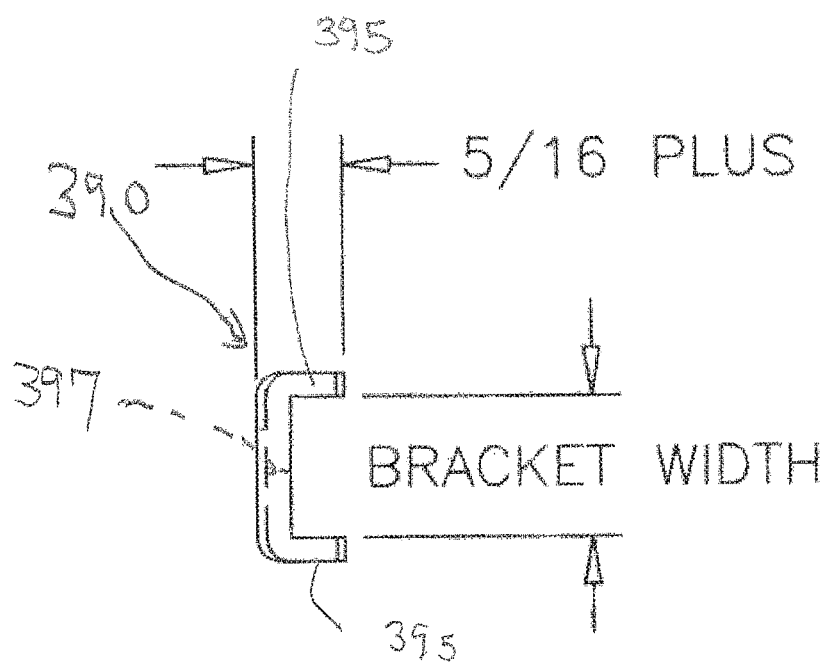
FIG. 26 is a diagrammatic top view, partly in phantom, of the retainer washer employed with the bracket of FIG. 22.

FIGS. 22-26 illustrate a tie-in bracket 310 wherein the bracket generally has the same geometry as bracket 210 except for the linear flat rear edges 331 and 351 which are disposed at a right angle to the base 318 and do not have the concavity characteristic of edges 233 and 253. In this embodiment, the retainer washer 390 is substantially linear and is generally rectilinear and again mounts to engage the rear edge portions of the guide slot 370 and has a vertical slot-like opening 397 which receives the fastener 12 (FIGS. 23, 25 and 26). The retainer washer 390 also has locking tabs 395 which engage rear portions of walls 331 and 351.

It will be appreciated that the forward walls of the guide slot are angled at approximately 37° to the base 318. In some modified embodiments, the retainer washer 390 extends along the entire rear face of the rear edges of the guide slot 370 and has a central slot-like opening 397 so that the fastener and washer may be received at a wide variety of distances from the base 318.

FIGS. 27-33 illustrate a fifth embodiment of a bracket/fastener assembly comprising a bracket 410 which accommodates a wide range of space constraints and is adapted for a wide range of applications to tie one structure to a second structure and which is anchored to the first structure so as to transfer tension forces between the structures to shear forces exerted on the bracket fasteners. The corresponding structures for brackets 410 in FIGS. 27-33 are designated by the same numerals as the structure for bracket 10 preceded by the numeral 4. All dimensions are in inches.

Bracket 410 is adapted for a different method of installation than that of brackets 10, 110, 210 and 310 in that in the preferred application, the fastener 412 is first torqued into the support structure at a location either adjacent the side of the joist or the underside edge of the joist. After the fastener 412 is torqued a suitable distance, the bracket 410 is then positioned over the upper unthreaded portion of the shank 419 of the fastener 412 so that the head portion comprising the head 415, the flange 417 and a portion of the unthreaded shank 419 passes through an opening 411 (FIG. 27) formed in bracket 410. Fasteners 14 are then torqued through the various openings 427, 428, 429, 429A, 447, 448, 449, 449A which, in the illustrated (FIG. 27) embodiment, are a total of eight. Again, the latter openings are generally not aligned and located in non-aligned positions.

Bracket 410 forms a guide slot 470 having a lateral dimension which is substantially equal but slightly larger than the outside diameter of the unthreaded upper shank of the fastener (which, in the illustrated embodiment, the lateral dimension is approximately 0.250 inches). The guide slot 470 extends a distance in the illustrated embodiment of from 1¼ inches above the bottom surface of the base to an axis A which represents the central axis of the maximum distance of a received fastener above the bottom of the base or above the member to which the base is fastened. Because the bracket 410 is especially adapted for mounting over a fastener which is pre-installed, the base includes an opening 411 which is slightly larger but generally complementary in shape to a profile of the head portion comprising the fastener head 415 including the flange 417 and the upper unthreaded portion of the fastener shank 419 so that the head portion will pass through the opening 411 to allow the bracket 410 to be mounted over the pre-installed fastener 412.

The position of the fastener 412 along the guide slot 470 will be determined by the pre-installed spaced relationship of the fastener and the surface of the member to which the bracket will ultimately attach.

For bracket 410, two openings 429A, 459A are formed in the base adjacent the position of the fastener head 415 when the bracket is properly installed over the fastener. For bracket 410, the reinforcement ribs 438 and 458 essentially extend the length of the sections 420 and 440. Because the fasteners 14 are installed after the bracket 410 is positioned against the wood member and after the fastener 412 is installed, there is a clearance constraint. As schematically illustrated in FIG. 27, there is sufficient clearance schematically represented by a circle C so that a 7/16 driver can be employed to torque the fastener 14 in place and to allow sufficient clearance with the ribs 438, 458 and the fastener 412. It should also be appreciated that the position of the fasteners 14 are such that the most amount of the shear load will ultimately likely be applied to the fasteners in openings 429A and 459A.

A retainer washer 490 having an elongated slot 492 is then placed over the upper unthreaded portion of the shank 419 at the underside of the flange 417 so that the retainer slot 492 washer opens downwardly for the illustrated assembly. After all of the fasteners 14 have been connected, the head 415 of the tie-in fastener 412 is slightly torqued so that the flange 417 firmly engages against the retainer washer 490 and the washer is forced against the rear edge of the bracket guide slot 470.

With reference to FIGS. 30-32, the washer 490 has a pair of laterally spaced wings 494 which will engage the rear portions of the walls of the guide slot 470. The slot 492 terminates in a chamfered arcuate portion 496 which is dimensioned as a counterbore for the chamfered portion at the underside of the head of the fastener 415. As previously described, the washer 490 is placed over the fastener shank 419 after it is installed and is disposed between the flange 417 of the fastener head 415 and the rear edge of the guide slot 470. The washer 490 functions to distribute the force exerted by the head portion of the fastener against the guide slot 470 and also allows for a range of spacings of the pre-installed fastener 412 above the member to which the bracket attaches. The fastener 412 is torqued to snugly engage the washer 490 against the bracket after the bracket is installed over the fastener to complete the fastener assembly and bracket installation.

It will be appreciated that the retainer washer 490 has wings 494 that engage against the rear portions of the bracket side walls 431 and 451 and keep the walls from flaring outwardly (laterally). The retainer washer 490 also more equally distributes the load against the end of the bracket. In addition, the guide slot 470 and the bracket positioning, allows for the bracket to be installed in a range of spacings from the side (or the underside) of the joist.

Figure 33:
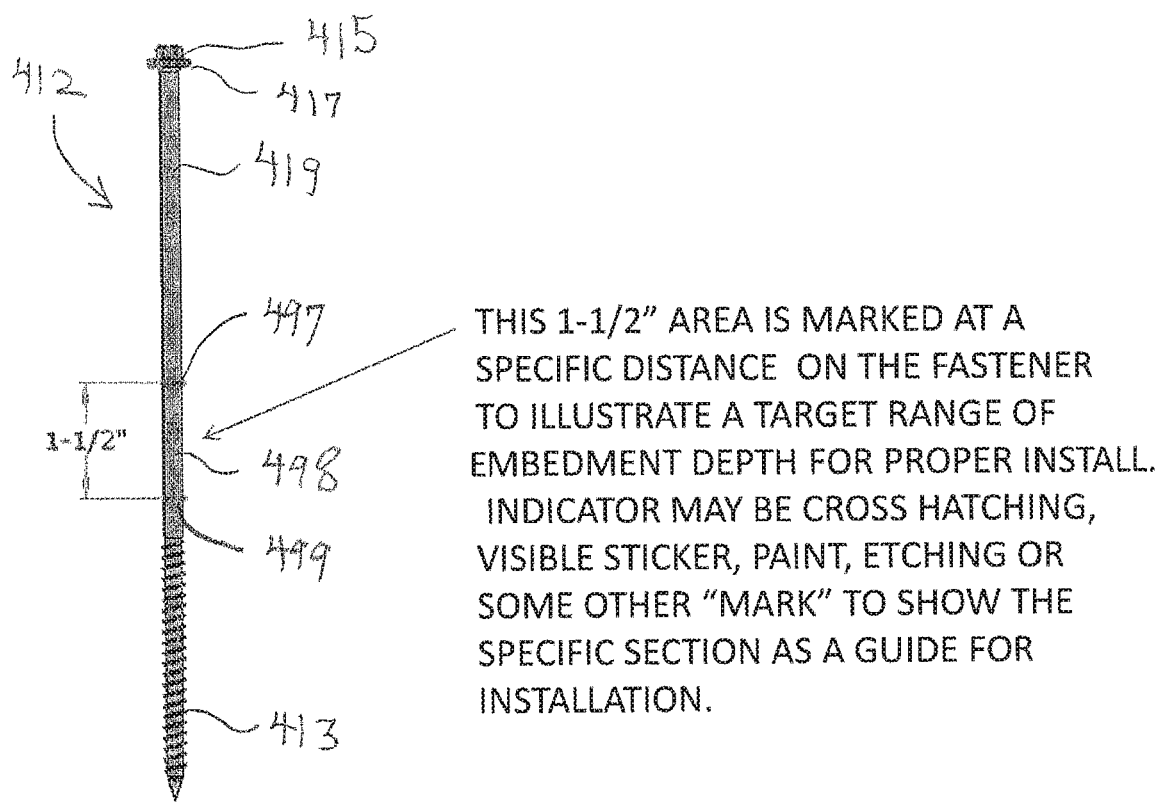
FIG. 33 is an annotated diagrammatic side view of the fastener employed with the bracket/fastener assembly of FIG. 27.
Figure 34:
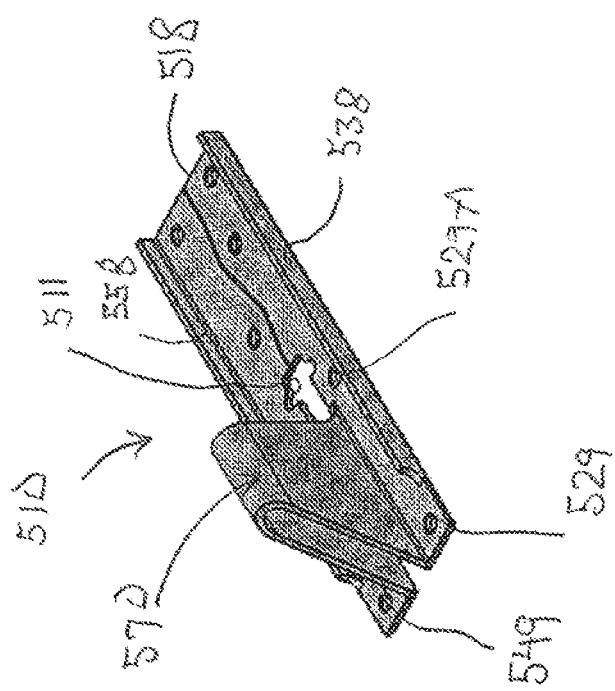
FIG. 34 is a perspective view of a sixth embodiment of a bracket.
Figure 35:
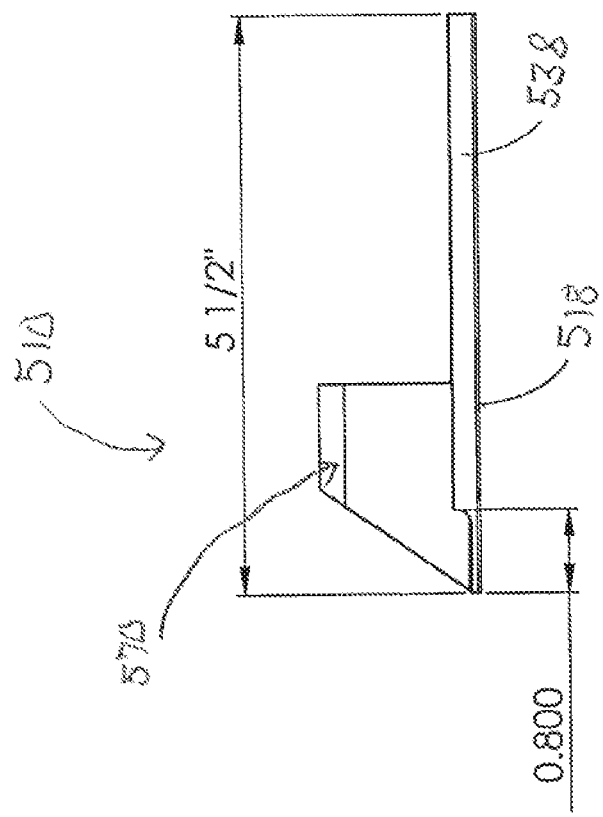
FIG. 35 is a diagrammatic side elevational view of the bracket of FIG. 34.
Figure 36:
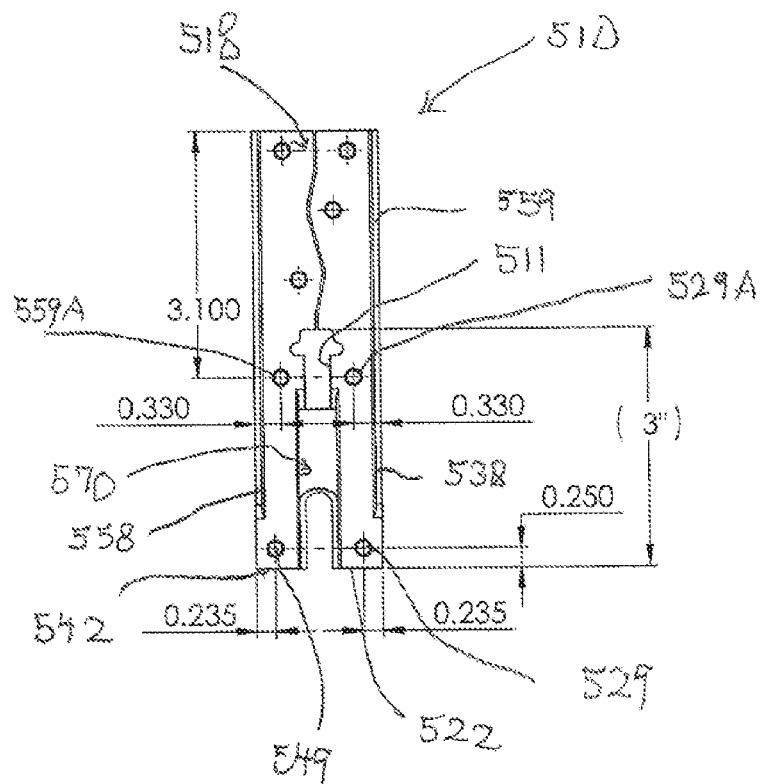
FIG. 36 is a diagrammatic top plan view of the bracket of FIG. 34.
Figure 37:
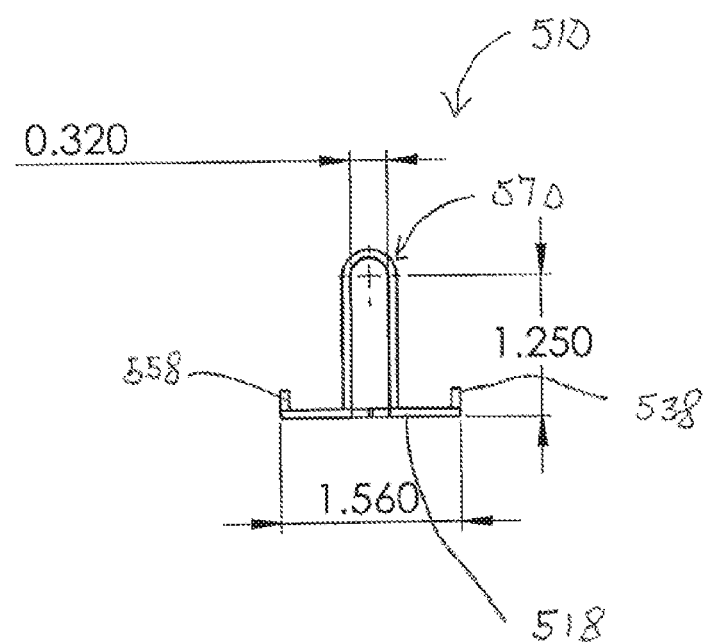
FIG. 37 is a diagrammatic left end view of the bracket of FIG. 34.
Figure 38:
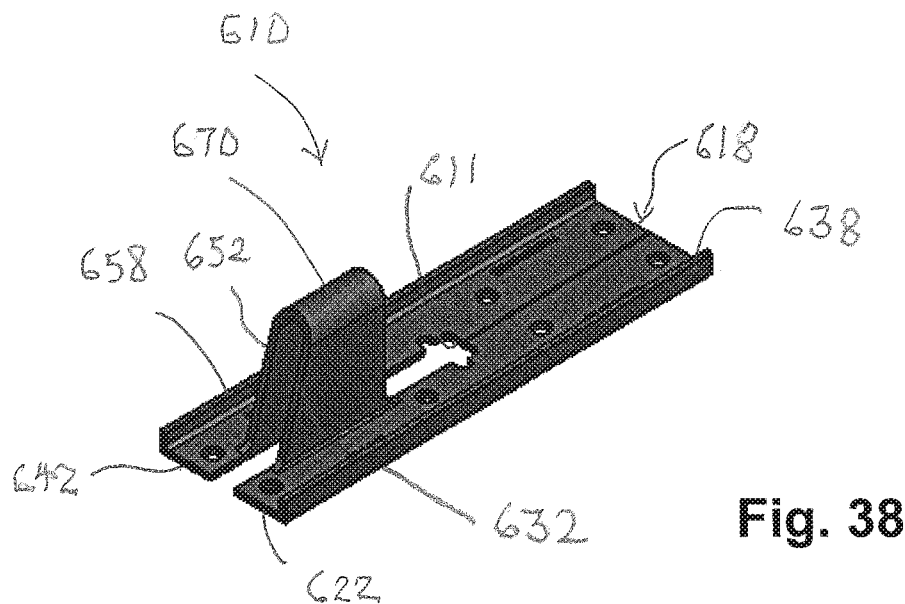
FIG. 38 is a perspective view of a seventh embodiment of a bracket.

With reference to FIG. 33, it is preferred that the fastener 412 has a mark 498 to indicate an acceptable target range for embedding the fasteners. The mark 498 ensures that the installer reliably installs the fastener at a proper positioning to provide a high integrity connection and to comply with various building codes. The longitudinal ends 497, 499 of the mark 498 are preferably spaced 1½ inches apart. There are preferably two mark ends also spaced from the end of the thread to accommodate a half-inch OSB board and the ledger board (mark 497) or to accommodate merely the ledger board with the OSB board not being present (mark 499). The mark 498 can be indicated by a rough surface zone on the fastener which extends between the two markings or a pineapple-like ribbing on the fastener which has opposed ends or a mark inscribed circumferentially around the fastener or a tape which wraps around the fastener with the opposed sides of the tape indicating the appropriate marking or a mark which is scored on the side of the fastener.

With reference to FIG. 33, the fastener is properly pre-positioned by reference to the markings on the fastener so as to allow for the bracket 410 to be self-positioned once it is mounted over the installed fastener.

FIGS. 34-37 illustrate a sixth embodiment of a bracket 510 which accommodates a wide range of space constraints and is adapted for a wide range of applications to tie one structure to a second structure and which is anchored to the first structure so as to transfer tension forces between the structures to sheer forces exerted on the bracket fasteners (not illustrated). Corresponding structures for bracket 510 in FIGS. 34-37 are designated with the same numerals as the structures for bracket 410 except that the structures are preceded by the numeral 5 rather than the numeral 4. All dimensions are in inches. Bracket 510 has substantially the same structure as bracket 410 and functions in substantially the same way except for the change in certain dimensions which are indicated by an asterisk in FIGS. 35-37 and for other structural modifications which are discussed below.

The opening 511 has been enlarged and moved away from the guide slot 570 to better accommodate the installation wherein the bracket is mounted over a fastener which is pre-installed. The width of the base 518 is slightly larger.

To further provide headroom for driving the fastener for bracket 510, two openings 519A and 559A are formed in the base 518 at a slightly different position adjacent the position of the fastener head upon the bracket being properly installed over the fastener.

The reinforcement ribs 538 and 558 do not extend the entire length of the base, but terminate so that there will be more clearance for driving fasteners through openings 529 and 549 adjacent the front 522, 542.

FIGS. 38-43 illustrate a seventh embodiment of a bracket 610 which, in one preferred form, has a length of approximately 5.5 inches and a width of approximately 1.6 inches. Bracket 610 accommodates a wide range of space constraints and is adapted for a wide range of applications to tie one structure to a second structure. The bracket is adapted to be anchored to the first structure so as to transfer tension forces between the structures to shear forces exerted on the bracket fasteners (not illustrated in FIGS. 38-43). The corresponding structures for bracket 610 in FIGS. 38-43 are designated with the same numerals as for the corresponding structures for bracket 410 except that the lead numerals is the numeral 6 rather than the numeral 4. All dimensions are in inches.

The bracket is preferably formed from a single sheet of metal, such as steel. The openings 627 and 647 in the base are positioned to provide ample headroom to drive the fasteners through the openings. The adjacent inward engagement edges 626 and 646 of the base 618 are linear and essentially engage along a linear, strip-like interface.

The reinforcement ribs 638 and 658 extend essentially the entire length of the base 618 and project upwardly approximately 0.250 inches from the base.

The upright guide 670 is positioned toward the front end 642, 622 of the bracket. The guide 670 mounts over a pre-installed fastener 12 or other fastener.

The forward walls 632 and 652 of the guide 670 is angled at approximately 73° to the base. The linear flat rear edges 631 and 651 extend upwardly at essentially a right angle to the base 618.

An opening 611 is formed in the base to accommodate the preferred installation wherein the bracket 610 is mounted over the pre-installed fastener.

Figures 39, 40:
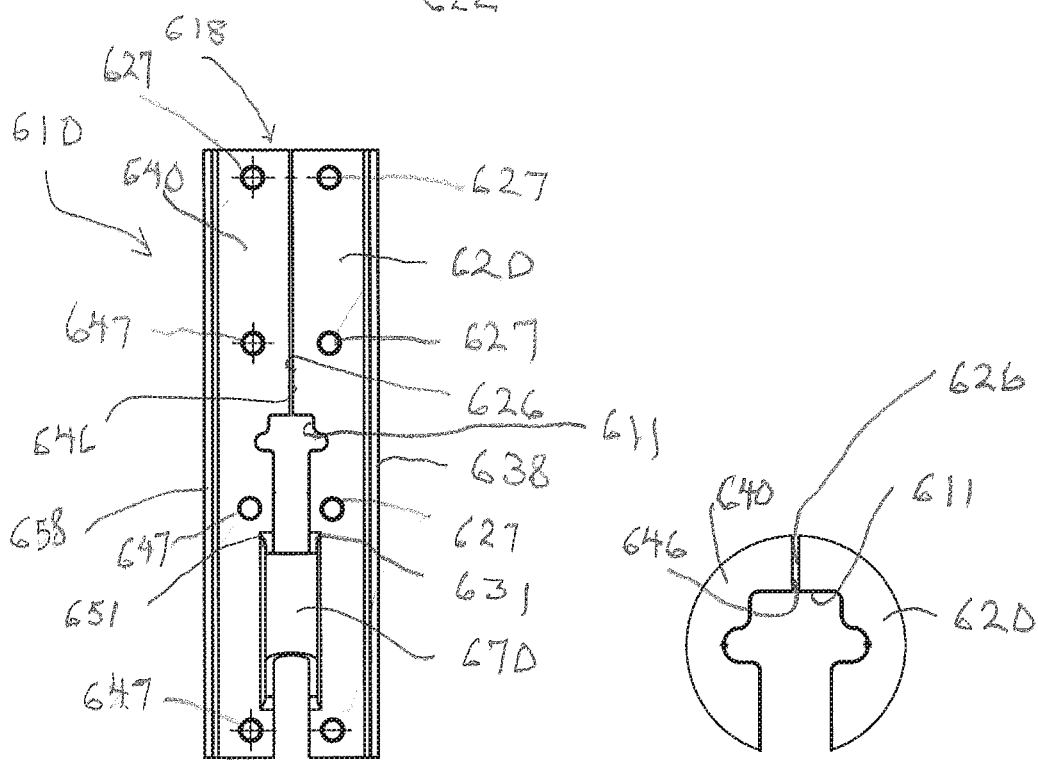
FIG. 39 is a top plan view of the bracket of FIG. 38.
FIG. 40 is an enlarged view of a central portion of the bracket as illustrated in FIG. 39.
Figure 42:
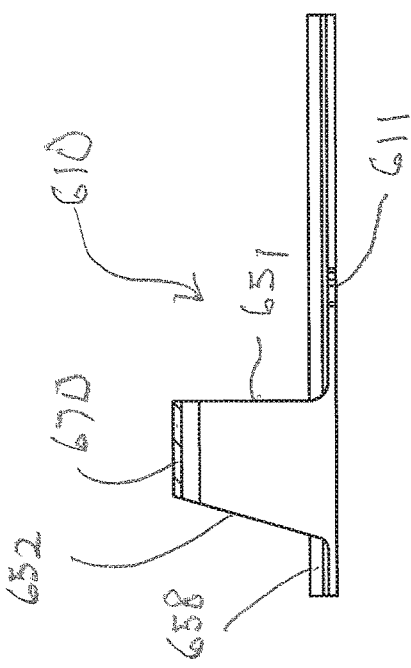
FIG. 42 is a side sectional view of the bracket of FIG. 41 taken along the line B-B thereof.
Figure 41:
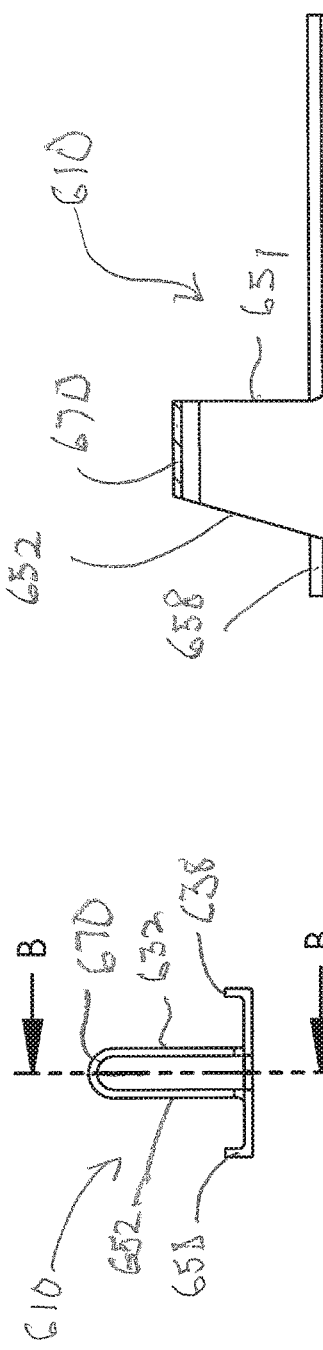
FIG. 41 is an end view of the bracket of FIG. 38.
Figure 43:
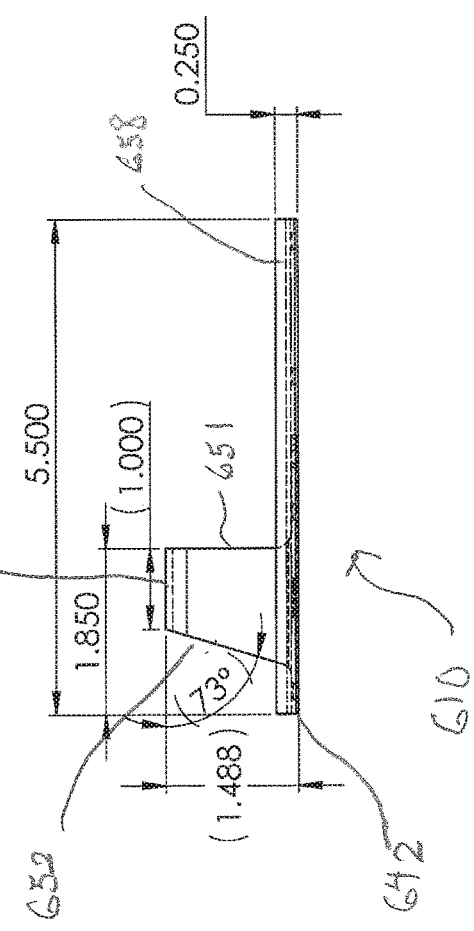
FIG. 43 is a diagrammatic side sectional view, portions illustrated in phantom, of the sectional view of FIG. 42.

The central opening 611 is slightly larger and generally complementary in shape to a profile of the head portion comprising the fastener head and including the flange and upper unthreaded portion of a fastener shank, as best illustrated in FIG. 40.

While preferred embodiments of the foregoing have been set forth for purposes of illustration, the foregoing descriptions should not be deemed a limitation of the invention herein. Accordingly, various modifications, adaptations and alternatives may occur to one skilled in the art without departing from the spirit and the scope of the present invention.

The invention claimed is:

1. A bracket comprising:
   a mounting base comprising two adjacent base sections having adjacent complementary edges, each base section defining a top surface and a bottom surface and extending from a rear edge to a front edge with one or more fastener openings extending from the top surface to the bottom surface of each respective base section; and
   a guide member extending above the top surfaces of the base sections and having a rear edge and an opposite front edge and defining a pass through opening from the rear edge to the front edge, wherein
   the adjacent complimentary edges of the base sections combine to define a fastener profile opening extending from a proximal end intermediate the front edges and rear edges of the mounting base to a distal portion extending from the proximal end through the front edges of the base members, and
   the fastener profile opening and the pass through opening are open to one another.

2. The bracket of claim 1, wherein the proximal end is enlarged in comparison to the distal portion.

3. The bracket of claim 2, wherein the proximal end takes a shape generally like an enlarged head of an elongate fastener.

4. The bracket of claim 3, wherein the distal portion has the shape of a fastener shank.

5. The bracket of claim 1, wherein the adjacent base sections are substantially flat.

6. The bracket of claim 5, wherein the adjacent base sections are substantially coplanar.

7. The bracket of claim 1, wherein the profile opening has the shape of a fastener shank extending from an enlarged fastener head.

8. The bracket of claim 7, wherein the profile opening includes a profile shape of a washer positioned between the head and the shank.

9. The bracket of claim 1, wherein the guide member comprises a pair of opposing side walls, each side wall extending upward from a base section to a top end that transitions one of the side walls into the other of the guide walls.

10. The bracket of claim 1, wherein said guide member has a substantially U-shaped cross section.

11. The bracket of claim 1, wherein said guide member extends integrally from said base sections.

12. The bracket of claim 1, wherein the guide member comprises a pair of opposing side walls, each side wall extending upward from a base section substantially perpendicularly to said base sections.

13. The bracket of claim 1, wherein the rear edge of the guide member extends substantially perpendicularly to said base sections and the front edge of the guide member extends at an acute angle relative to the base sections.

14. A bracket comprising:
a sheet having adjacent complimentary edges extending from a rear end to a front end, thereby forming two opposing lateral sections extending from the forward end to the rear end, each of the adjacent complimentary edges having a profile section with the profile sections in alignment with one another to combine to define a fastener profile opening that accommodates a portion of an elongate fastener; and
a guide defining a pass through opening with a longitudinal axis spaced from said surfaces above said profile sections and laterally aligned with the adjacent complimentary edges, wherein
the fastener profile opening and the pass through opening are open to one another.

15. The bracket of claim 14, wherein the profile sections of the respective adjacent complimentary edges combine to define a fastener profile having a distal shank portion extending from a proximal enlarged head portion.

16. The bracket of claim 15, wherein the guide comprises a pair of guide walls laterally spaced from one another, with each guide wall in the pair of guide walls extending upward from one of the two opposing lateral sections of the sheet, and an upper transition section extending between and connecting the guide walls to one another.

17. The bracket of claim 16, wherein each guide wall of the pair extends upward from the profile section of the complimentary edge of the respective lateral section from which the guide wall extends.

18. The bracket of claim 17, wherein each of the guide walls extends from a complimentary edge at the distal shank portion of the respective complimentary edge.

19. The bracket of claim 14, wherein said bracket is formed from a single integral sheet of material.

20. A bracket comprising:
a sheet having medial edges which are disposed in adjacent relationship and form sections having coplanar surfaces extending from a forward end to a rear end;
a guide having generally parallel wall portions defining a guide slot therebetween and extending integrally from said sections; and
one or more openings defined in each of said coplanar surfaces, wherein
each of the adjacent medial edges of the sheet includes a profile section with each profile section in lateral alignment with the other profile section, the profile sections combining to define a fastener profile opening extending through the forward end of the respective coplanar surfaces, and
each of the generally parallel wall portions of the guide transitions as a bend from the sheet at one of the adjacent medial edges at a profile section such that the fastener profile opening and guide are open to one another.

* * * * *